(12) United States Patent
Yamane et al.

(10) Patent No.: US 11,302,194 B2
(45) Date of Patent: Apr. 12, 2022

(54) MANAGEMENT DEVICE, MANAGEMENT METHOD, AND STORAGE MEDIUM

(71) Applicant: HONDA MOTOR CO., LTD., Tokyo (JP)

(72) Inventors: Katsuyasu Yamane, Wako (JP); Yoshitaka Mimura, Wako (JP); Hiroshi Yamanaka, Wako (JP); Chie Sugihara, Tokyo (JP); Yuki Motegi, Tokyo (JP); Tsubasa Shibauchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 141 days.

(21) Appl. No.: 16/817,666

(22) Filed: Mar. 13, 2020

(65) Prior Publication Data

US 2020/0302791 A1 Sep. 24, 2020

(30) Foreign Application Priority Data

Mar. 22, 2019 (JP) .............................. JP2019-054364

(51) Int. Cl.
*G08G 1/14* (2006.01)
*G06F 16/9035* (2019.01)
*G06K 9/62* (2006.01)

(52) U.S. Cl.
CPC .......... *G08G 1/149* (2013.01); *G06F 16/9035* (2019.01); *G06K 9/6267* (2013.01); *G08G 1/141* (2013.01); *G08G 1/145* (2013.01)

(58) Field of Classification Search
CPC ........ G08G 1/149; G08G 1/141; G08G 1/145; G06F 16/9035; G06K 9/6267
See application file for complete search history.

(56) References Cited

FOREIGN PATENT DOCUMENTS

JP         2017-182263         10/2017

*Primary Examiner* — Kam Wan Ma
(74) *Attorney, Agent, or Firm* — Amin, Turocy & Watson, LLP

(57) ABSTRACT

A management device includes an acquirer configured to acquire a plurality of requests for automated exit processing, a classifier configured to classify the requests into first requests of first users who are permitted to use a specific parking space and second requests of second users who are not permitted to use the specific parking space, and an instructor configured to cause vehicles associated with terminal devices which are transmission sources of the first requests to perform automated exit processing such that automated exit processing according to the first requests is continuously executed, or to cause vehicles associated with terminal devices which are transmission sources of the second requests to perform automated exit processing such that automated exit processing according to the second requests is continuously executed, on the basis of a result of the classification.

15 Claims, 23 Drawing Sheets

| TERMINAL DEVICE ID | TYPE OF REQUEST |
|---|---|
| 001 | PICK-UP |

| TERMINAL DEVICE ID | FIRST REQUEST | SECOND REQUEST | VEHICLE ID |
|---|---|---|---|
| 001 | ○ | | SD8582A |
| 002 | | ○ | SD8588A |
| 003 | | ○ | SD8595A |
| ⋮ | ⋮ | ⋮ | ⋮ |

| TERMINAL DEVICE ID | PRIORITY FLAG |
|---|---|
| 010 | A |
| 011 | B |
| 012 | C |
| ⋮ | ⋮ |

| TERMINAL DEVICE ID | TYPE OF REQUEST | DESIRE LEVEL |
|---|---|---|
| 001 | PICK-UP REQUEST | HIGH |
| 002 | PICK-UP REQUEST | MEDIUM |
| 003 | PICK-UP REQUEST | LOW |

MANAGEMENT DEVICE, MANAGEMENT METHOD, AND STORAGE MEDIUM

CROSS-REFERENCE TO RELATED APPLICATION

Priority is claimed on Japanese Patent Application No. 2019-054364, filed Mar. 22, 2019, the content of which is incorporated herein by reference.

BACKGROUND

Field

The present invention relates to a management device, a management method, and a storage medium.

Description of Related Art

In recent years, research on automatic control of vehicles has been conducted. In an automated valet parking device using this technology, a device which searches for a parking space as close to set conditions as possible based on facility migration information indicating an action of a user in a facility has been disclosed (Japanese Unexamined Patent Application, First Publication No. 2017-182263).

However, a user or an administrator may not be able to perform an appropriate operation in consideration of an action of the user in some cases.

SUMMARY

The present invention has been made in view of such a circumstance and an object thereof is to provide a management device, a management method, and a storage medium which can help a user or an administrator perform an appropriate operation.

A management device according to the present invention has adopted the following configurations.

(1): The management device according to one aspect of the present invention includes an acquirer configured to acquire requests for automated exit processing of causing a vehicle to exit from a parking lot and causing an occupant of the vehicle to board the vehicle in a boarding area, a classifier configured to classify the requests acquired by the acquirer into first requests of first users who are permitted to use a specific parking lot and second requests of second users who are not permitted to use the specific parking lot, and an instructor configured to cause vehicles associated with terminal devices which are transmission sources of one or more of the first requests acquired by the acquirer to perform automated exit processing such that automated exit processing according to the one or more of the first requests is continuously executed, or to cause vehicles associated with terminal devices which are transmission sources of one or more of the second requests acquired by the acquirer to perform automated exit processing such that automated exit processing according to the one or more of the second requests is continuously executed, on the basis of a result of the classification by the classifier.

(2): In the aspect of (1) described above, the instructor prioritizes the first requests classified by the classifier over the second requests classified by the classifier, or prioritizes the second requests classified by the classifier over the first requests classified by the classifier.

(3): In the aspect of (2) described above, when the acquirer has acquired a predetermined number or more of the first requests within a predetermined time, the instructor causes vehicles associated with terminal devices which are transmission sources of one or more of the first requests to continuously perform the automated exit processing.

(4): In the aspect of (2) described above, when the acquirer has acquired a predetermined number or more of the second requests within a predetermined time, the instructor causes vehicles associated with terminal devices which are transmission sources of one or more of the second requests to continuously perform the automated exit processing.

(5): In the aspect of (3) or (4) described above, when a degree of congestion in the boarding area is equal to or less than a threshold, the instructor stops continuously performing the automated exit processing.

(6): In the aspect of any one of (2) to (5) described above, the acquirer acquires the first requests and desire level information indicating desire levels for the first requests from first terminal devices held by the first users, and the instructor adjusts priority levels of the first requests on the basis of the desire levels.

(7): In the aspect of any one of (1) to (6) described above, the second requests are requests transmitted by second terminal devices held by the second users, and the device further comprises an information provider configured to notify the second terminal devices of information indicating the first requests are prioritized over the second requests or information indicating that starts of automated exit processing for the second requests are delayed by prioritizing the first requests over the second requests.

(8): In the aspect of (7) described above, the information provider provides information for inquiring of the second terminal devices whether to cancel the second requests after the notification.

(9): In the aspect of (8) described above, the acquirer acquires cancellation information of the second requests transmitted by the second terminal devices after the inquiry, and the instructor cancels the second requests on the basis of the cancellation information of the second requests, and furthermore preferentially performs automated exit processing associated with the second requests of second users of the second terminal devices which have transmitted the cancellation information in next and subsequent automated exit processing.

(10): In the aspect of (9) described above, the acquirer acquires designation information in which a timing for increasing priority levels of the second requests transmitted by the second terminal devices which have transmitted the cancellation information is designated, and the instructor increases the priority levels of the second requests transmitted by the second terminal devices on the basis of the designation information.

(11): In the aspect of any one of (2) to (10) described above, the acquirer acquires disposition information (or position information) of an assistant who assists an action of an occupant of the vehicle in the boarding area, and the instructor changes an order of exit instructions to cause vehicles subjected to automated exit processing in accordance with the requests to perform automated exit processing on the basis of position information of the assistant.

Aspects of a management device according to the present invention have adopted the following configuration.

(12): The management device includes an acquirer configured to acquire requests for automated exit processing of causing a vehicle to exit from a parking lot and causing an occupant of the vehicle to board the vehicle in a boarding area, a classifier configured to classify requests acquired by the acquirer into first requests of first users who are estimated to take a long time to board the vehicle in the boarding area and second requests of second users who are estimated to take a shorter time to board the vehicle than the first users, and an instructor configured to cause vehicles associated with terminal devices which are transmission sources of one or more of the first requests acquired by the acquirer such that automated exit processing according to the one or more of the first requests is continuously executed, or to cause vehicles associated with terminal devices which are transmission sources of one or more of the second requests acquired by the acquirer such that automated exit processing according to the one or more of the second requests is continuously executed, on the basis of a result of the classification.

(13): In the aspect of (12) described above, a user who is estimated to be slow in boarding the vehicle includes a user carrying a certain degree or more of luggage, a user accompanying with a child, a user of a vehicle with a child seat installed therein, or a user who took a predetermined time or more to get off a vehicle.

A management method according to the present invention has adopted the following configuration.

(14): The management method includes, by a computer, acquiring requests for automated exit processing of causing a vehicle to exit from a parking lot and causing an occupant of the vehicle to board the vehicle in a boarding area, classifying the acquired requests into first requests of first users who are permitted to use a specific parking space and second requests of second users who are permitted to use the specific parking space, and causing vehicles associated with terminal devices which are transmission sources of the acquired one or more of the first requests to perform automated exit processing such that automated exit processing according to the one or more of the first requests is continuously executed, or causing vehicles associated with terminal devices which are transmission sources of the acquired one or more of the second requests to perform automated exit processing such that automated exit processing according to the one or more of the second requests is continuously executed, on the basis of a result of the classification.

A storage medium according to the present invention has adopted the following configuration.

(15): The non-transitory computer-readable storage medium stores a computer program to be executed by a computer to perform at least: acquiring requests for automated exit processing of causing a vehicle to exit from a parking lot and causing an occupant of the vehicle to board the vehicle in a boarding area; classifying the acquired requests into first requests of first users who are permitted to use a specific parking space and second requests of second users who are permitted to use the specific parking space, and causing vehicles associated with terminal devices which are transmission sources of the acquired one or more of the first requests to perform automated exit processing such that automated exit processing according to the one or more of the first requests is continuously executed, or causing vehicles associated with terminal devices which are transmission sources of the acquired one or more of the second requests to perform automated exit processing such that automated exit processing according to the one or more of the second requests is continuously executed, on the basis of a result of the classification.

According to (1) to (4) and (12) to (15), a user or an administrator can perform an appropriate operation.

According to (5), when a degree of congestion is equal to or less than a threshold, since the vehicle exits smoothly even though automated exit processing is not continuously performed, it is possible to further curb management for an useless exit.

According to (6), it is possible to further realize an exit matching a user's wish.

According to (7) and (8), since information indicating that a start of automated exit processing is delayed is notified, it is possible to further improve convenience of a user.

According to (9) and (10), in next and subsequent automated exit processing, automated exit processing associated with the second requests of the second users of the second terminal devices which have transmitted cancellation information is preferentially performed, and thereby it is possible to improve a satisfaction level of a user.

According to (11), it is possible to further perform an exit management in accordance with an operation system of the facility.

BRIEF DESCRIPTION OF THE DRAWINGS

FIG. 9 is a diagram which shows an example of content of information included in a pick-up request transmitted by a terminal device.

FIG. 10 is a diagram which shows an example of content of classification reference information.

FIG. 15 is a diagram which shows an example of content of priority flag information in which a terminal device and a priority flag are associated with each other.

FIG. 20 is a diagram which shows an example of correspondence information.

DETAILED DESCRIPTION

Hereinafter, embodiments of a management device, a management method, and a storage medium of the present invention will be described with reference to the drawings.

First Embodiment

[Overall Configuration]

Figure 1:
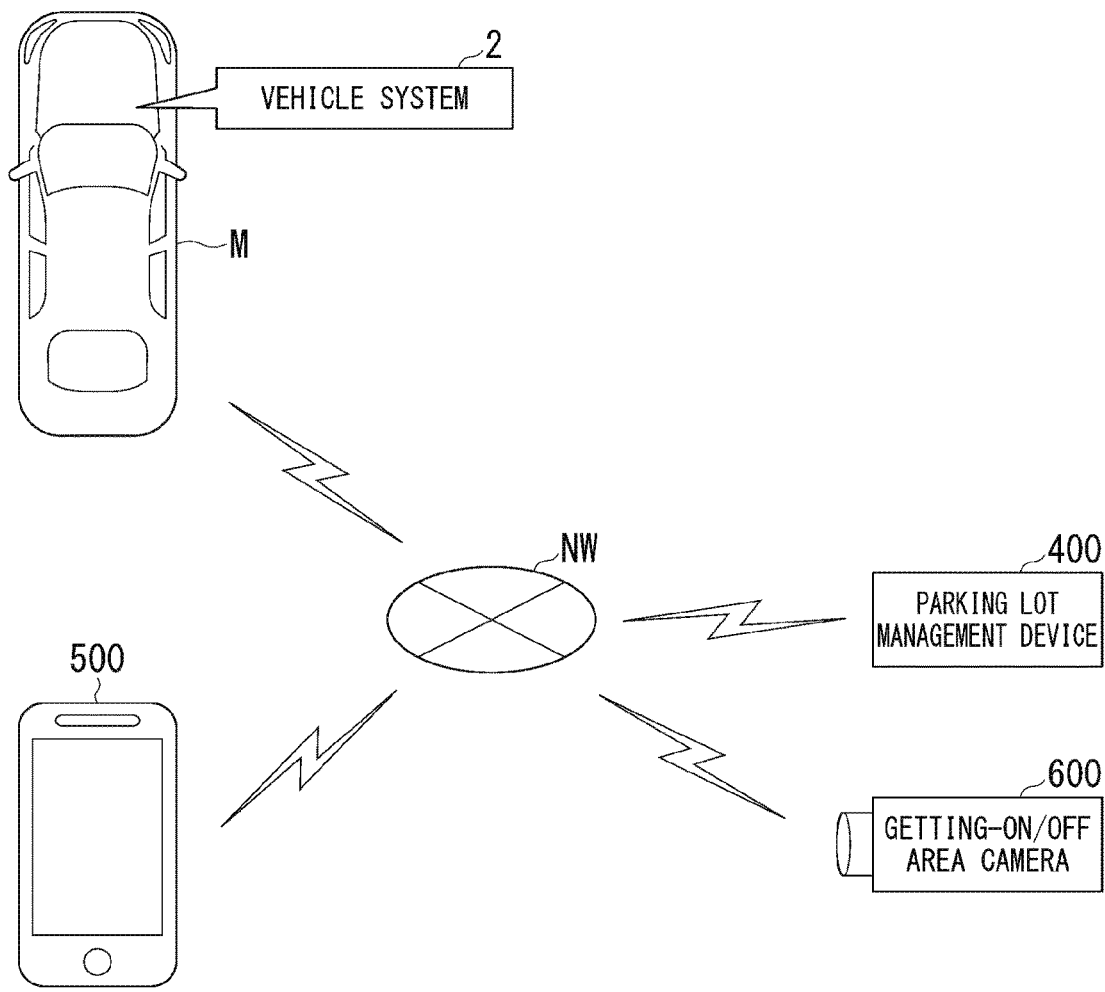
FIG. 1 is a configuration diagram of a parking lot management system including a vehicle system 2.

FIG. 1 is a configuration diagram of a parking lot management system 1 including a vehicle system 2. The parking lot management system 1 includes, for example, one or more vehicles (hereinafter, a host vehicle M) on which the vehicle system 2 is mounted, one or more parking lot management devices 400, one or more terminal devices 500, and one or more getting-on/off area cameras 600. These components are communicable with each other via a network NW. The network NW includes a cellular network, a Wi-Fi network, the Internet, a wide area network (WAN), a local area network (LAN), a public line, a provider device, a dedicated line, a wireless base station, and the like. Each of these components may directly perform wireless communication without going through the network NW. Details of the host vehicle M and the parking lot management device 400 will be described below.

Figure 2:
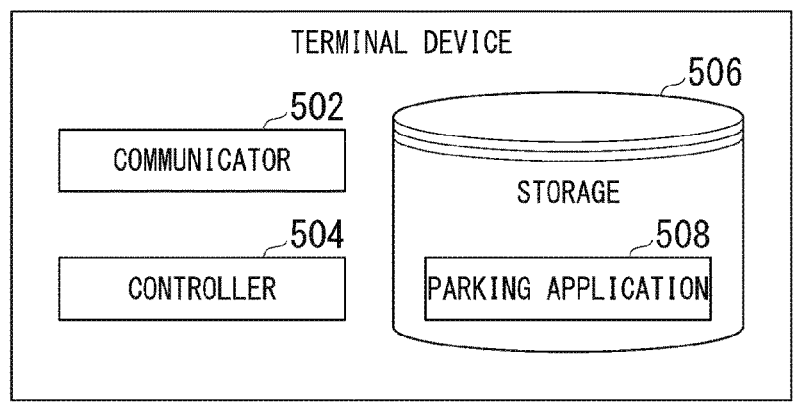
FIG. 2 is a diagram which shows an example of a functional configuration of a terminal device.

FIG. 2 is a diagram which shows an example of a functional configuration of the terminal device 500. The terminal device 500 is, for example, a smartphone, a tablet terminal, a personal computer, or the like. In the terminal device 500, an application program or a browser for using the parking lot management system 1 is started to support services to be described below. In the following description, it is assumed as a premise that the terminal device 500 performs various types of processing by a central processing unit (CPU) of the smartphone executing an application program (a parking application 508) stored in the storage 506. The parking application 508 communicates with the parking lot management device 400 in accordance with an operation of the user, and transmits a request of the user to the parking lot management device 400 or performs a push notification based on information received from the parking lot management device 400.

The terminal device 500 includes, for example, a communicator 502, a controller 504, and a storage 506. The communicator 502 is, for example, a communication interface that communicates with the host vehicle M, the parking lot management device 400, and the like via the network NW.

The controller 504 is a functional unit realized by the CPU executing the parking application 508. The controller 504 generates information based on an operation performed on a touch panel or the like of the terminal device 500, and transmits the generated information to another device using the communicator 502.

The getting-on/off area camera 600 is, for example, a digital camera using a solid-state imaging device such as a charge coupled device (CCD) or a complementary metal oxide semiconductor (CMOS). The getting-on/off area camera 600 captures images of a getting-on/off area at which the user boards the vehicle, a stop area at which the vehicle stops to allow the user to board the vehicle, and an area including vicinities of each area described above at predetermined intervals in an autonomous parking event in which the vehicle automatically travels and parks in an unmanned manner or a manned manner in valet parking or the like executed in the parking lot management system 1. The getting-on/off area camera 600 communicates with the parking lot management device 400 via the network NW using a communication unit mounted on the camera 600, and transmits the captured images to the parking lot management device 400.

Figure 3:
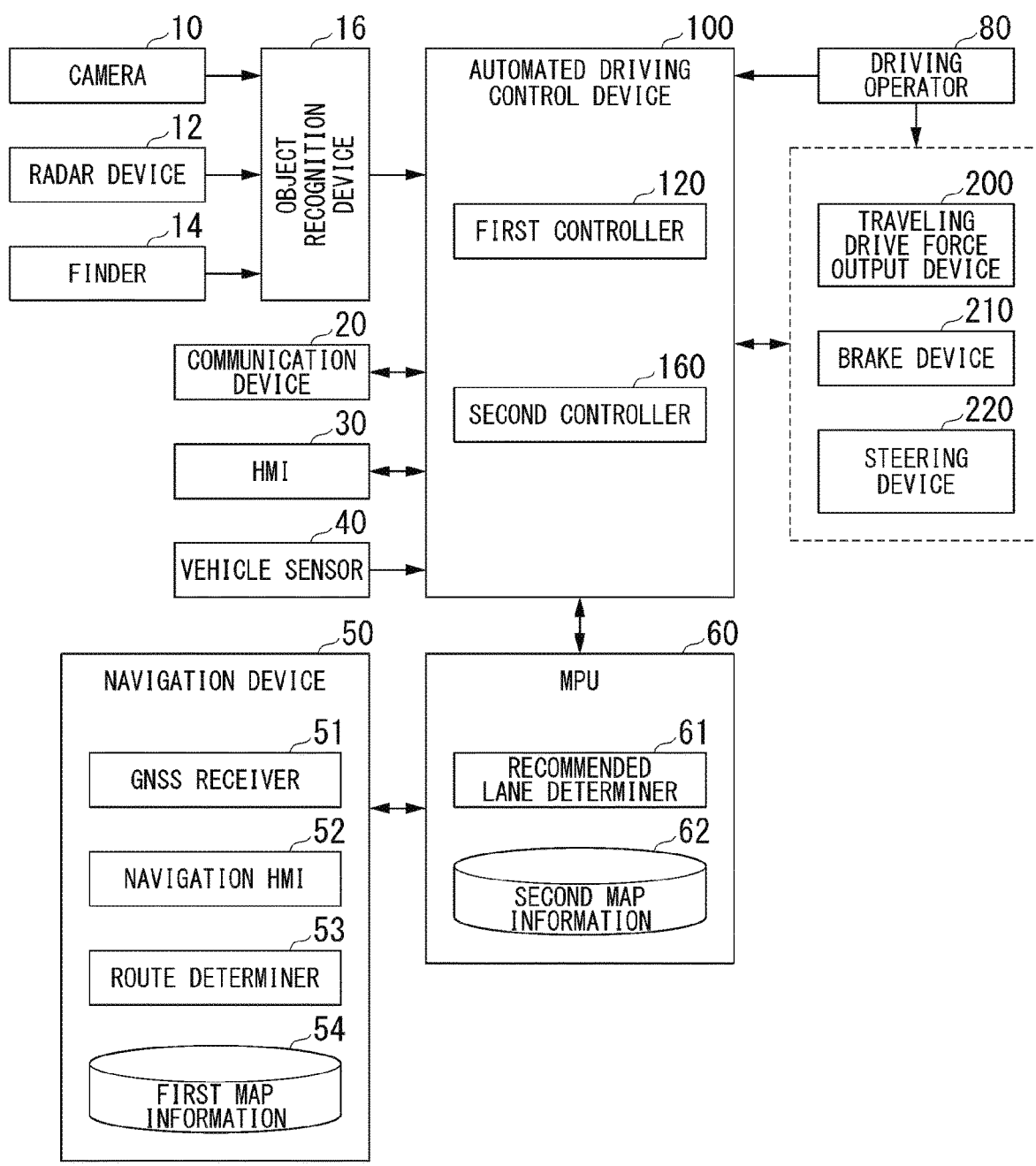
FIG. 3 is a configuration diagram of a vehicle system using a vehicle control device according to an embodiment.

FIG. 3 is a configuration diagram of the vehicle system 2 using a vehicle control device according to the embodiment. A vehicle on which the vehicle system 2 is mounted is, for example, two-wheel, three-wheel, or four-wheel vehicle, and a driving source thereof is an internal combustion engine such as a diesel engine or a gasoline engine, an electric motor, or a combination thereof. The electric motor operates using electric power generated by a generator connected to the internal combustion engine, or electric power discharged from a secondary battery or a fuel cell.

The vehicle system 2 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a traveling drive force output device 200, a brake device 210, and a steering device 220. These devices or apparatuses are connected to each other by a multiplex communication line such as a controller area network (CAN) communicator line, a serial communication line, a wireless communication network, or the like. The configuration illustrated I FIG. 1 is merely an example, and part of the configuration may be omitted or another configuration may be added.

The camera 10 is, for example, a digital camera using a solid-state imaging device such as a CCD or a CMOS. The camera 10 is attached to an arbitrary position of a host vehicle M on which the vehicle system 2 is mounted. When the front is imaged, the camera 10 is attached to an upper part of the front windshield, a rear surface of the rearview mirror, or the like. The camera 10 periodically and repeatedly captures images of a vicinity of the host vehicle M. The camera 10 may also be a stereo camera.

The radar device 12 radiates radio waves such as millimeter waves to the vicinity of the host vehicle M, and detects at least a position (a distance and an orientation) of an object by detecting radio waves (reflected waves) reflected by the object. The radar device 12 is attached to an arbitrary position of the host vehicle M. The radar device 12 may detect the position and a speed of the object using a frequency modulated continuous wave (FM-CW) method.

The finder 14 is a light detection and range (LIDAR). The finder 14 radiates light to the vicinity of the host vehicle M and measures scattered light. The finder 14 detects a distance to the target on the basis of time from light emission and light reception. The radiated light is, for example, pulsed laser light. The finder 14 is attached to an arbitrary position of the host vehicle M.

The object recognition device 16 performs sensor fusion processing on a result of detection performed by some or all of the camera 10, the radar device 12, and the finder 14 and recognizes the position, type, speed, and the like of the object. The object recognition device 16 outputs a result of the recognition to the automated driving control device 100. The object recognition device 16 may output the results of detection by the camera 10, the radar device 12, and the finder 14 to the automated driving control device 100 as they are. The object recognition device 16 may be omitted from the vehicle system 2.

The communication device 20 uses, for example, a cellular network, a Wi-Fi network, a Bluetooth (a registered trademark), a dedicated short range communication (DSRC), or the like, and communicates with another vehicle or a parking lot management device (to be described below) present in the vicinity of the host vehicle M or various types of server devices.

The HMI 30 presents various types of information to an occupant of the host vehicle M and receives an input operation from an occupant. The HMI 30 includes various display devices, speakers, buzzers, touch panels, switches, keys, and the like.

The vehicle sensor 40 includes a vehicle speed sensor that detects the speed of the host vehicle M, an acceleration sensor that detects the acceleration, a yaw rate sensor that detects an angular speed around a vertical axis, an orientation sensor that detects a direction of the host vehicle M, and the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 identifies the position of the host vehicle M on the basis of a signal received from a GNSS satellite. The position of the host vehicle M may be identified or supplemented by an inertial navigation system (INS) using an output of the vehicle sensor 40. The navigation HMI 52 includes a display device, a speaker, a touch panel, a key, and the like. The navigation HMI 52 may be partially or entirely shared with the HMI 30 described above. The route determiner 53 determines, for example, a route (hereinafter, a route on a map) from the position (or an arbitrary input position) of the host vehicle M identified by the GNSS receiver 51 to a destination input from the occupant using the navigation HMI 52 with reference to the first map information 54. The first map information 54 is, for example, information in which a road shape is expressed by a link indicating a road and a node connected by the link. The first map information 54 may include curvature of a road, point of interest (POI) information, and the like.

The route on a map is output to the MPU 60. The navigation device 50 may perform route guidance using the navigation HMI 52 on the basis of the route on a map. The navigation device 50 may be realized by, for example, a function of a terminal device such as a smart phone or a tablet terminal owned by the occupant. The navigation device 50 may transmit a current position and a destination to a navigation server via the communication device 20 and acquire a route equivalent to the route on a map from the navigation server.

The MPU 60 includes, for example, a recommended lane determiner 61, and holds second map information 62 in the storage device such as an HDD or a flash memory. The recommended lane determiner 61 divides the route on a map provided from the navigation device 50 into a plurality of blocks (for example, divides every 100 [m] in a vehicle traveling direction), and determines a recommended lane for each block with reference to the second map information 62. The recommended lane determiner 61 determines which numbered lane to travel from the left. When there is a branch point in the route on a map, the recommended lane determiner 61 determines a recommended lane such that the host vehicle M travels in a reasonable route for traveling to a branch destination.

The second map information 62 is map information with higher accuracy than the first map information 54. The second map information 62 includes, for example, information on a center of a lane or information on a boundary of the lane. The second map information 62 may include road information, traffic regulation information, address information (addresses/postal codes), facility information, telephone number information, and the like. The second map information 62 may be updated at any time by the communication device 20 communicating with another device.

The driving operator 80 includes, for example, an accelerator pedal, a brake pedal, a shift lever, a steering wheel, a modified steer, a joystick, and other operators. A sensor that detects an operation amount or a presence or absence of an operation is attached to the driving operator 80, and this detection result is output to the automated driving control device 100 or some or all of the traveling drive force output device 200, the brake device 210, and the steering device 220.

The automated driving control device 100 includes, for example, a first controller 120 and a second controller 160. The first controller 120 and the second controller 160 are realized, for example, by a hardware processor such as a CPU executing a program (software). Some or all of these components may be realized by hardware (a circuit; including circuitry) such as a large scale integration (LSI), an application specific integrated circuit (ASIC), a field-programmable gate array (FPGA), and a graphics processing unit (GPU), and may also be realized by a cooperation of software and hardware. The program may be stored in advance in a storage device (a storage device including a non-transitory storage medium) such as an HDD or a flash memory of the automated driving control device 100, or may be stored in a detachable storage medium such as a DVD or a CD-ROM and installed in the HDD or the flash memory of the automated driving control device 100 by the storage medium (the non-transitory storage medium) being mounted on a drive device.

Figure 4:
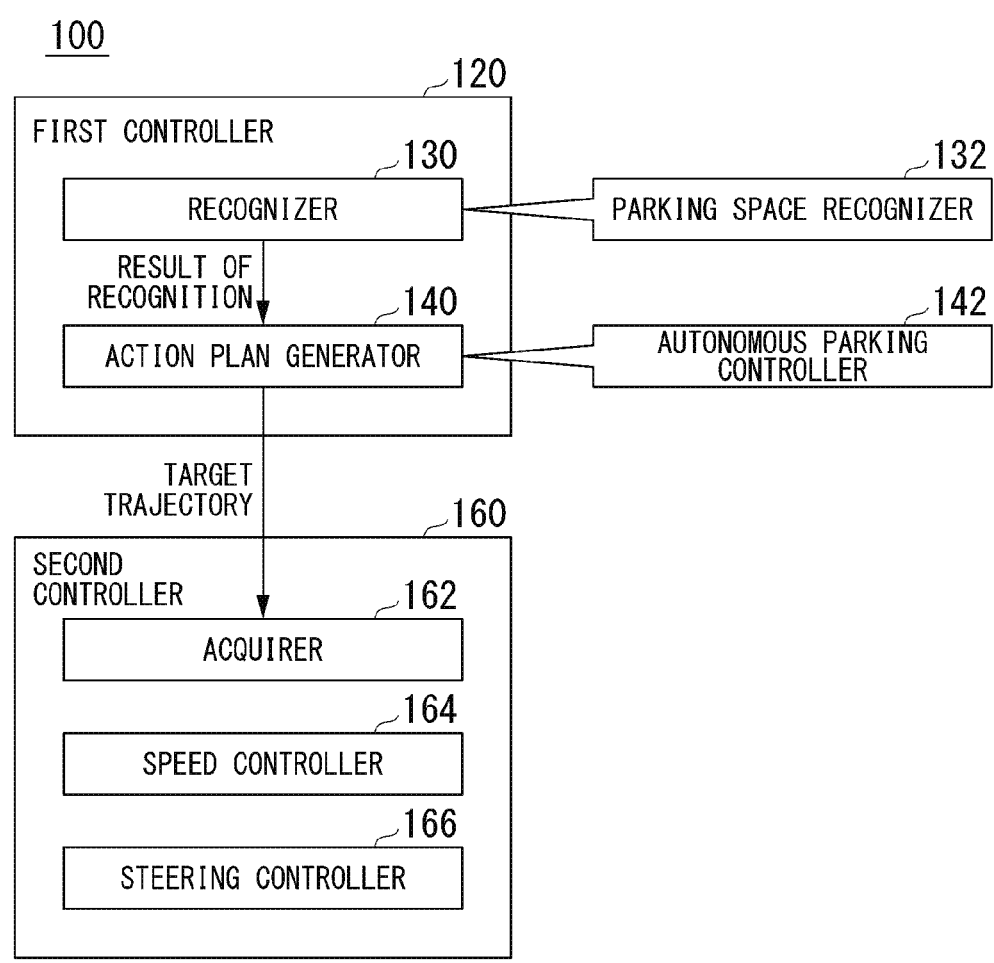
FIG. 4 is a functional configuration diagram of a first controller and a second controller.

FIG. 4 is a functional configuration diagram of the first controller 120 and the second controller 160. The first controller 120 includes, for example, a recognizer 130 and an action plan generator 140. The first controller 120 realizes, for example, a function based on artificial intelligence (AI) and a function based on a model given in advance in parallel. For example, a function of "recognizing an intersection" may be realized by executing a recognition of an intersection by deep learning or the like and a recognition based on conditions (including pattern matching signals, road markings, and the like) given in advance in parallel and comprehensively evaluating the both by scoring them. As a result, a reliability of automated driving is guaranteed.

The recognizer 130 recognizes states such as the position, speed and acceleration of the object in the vicinity of the host vehicle M on the basis of information input from the camera 10, the radar device 12, and the finder 14 via the object recognition device 16. The position of the object is, for example, recognized as a position on absolute coordinates having the origin at a representative point (a center of gravity, a center of a drive axis, or the like) of the host vehicle M, and is used for control. The position of the object may be represented by a representative point such as a center of gravity or a corner of the object, or may be represented by an expressed area. A "state" of the object may include the acceleration or jerk of the object, or an "action state" (for example, whether a lane is changed or is intended to be changed).

The recognizer 130 recognizes, for example, a lane (traveling lane) in which the host vehicle M is traveling. For example, the recognizer 130 recognizes a traveling lane by comparing a pattern (for example, an array of solid lines and dashed lines) of a road section line obtained from the second map information 62 with a pattern of a road section line in the vicinity of the host vehicle M recognized from an image captured by the camera 10. The recognizer 130 may recognize a traveling lane by recognizing not only a road section line but also a traveling road boundary (road boundary) including road section lines, road shoulders, curbs, median strips, guardrails, and the like. In this recognition, the position of the host vehicle M acquired from the navigation device 50 and a result of processing performed by the INS may be added. The recognizer 130 recognizes temporary stop lines, obstacles, red light, tollgates, or other road events.

When a traveling lane is recognized, the recognizer 130 recognizes the position and posture of the host vehicle M with respect to the traveling lane. The recognizer 130 may recognize, for example, a deviation of a reference point of the host vehicle M from a lane center and an angle formed with respect to a line connecting the lane centers in a traveling direction of the host vehicle M as the relative position and posture of the host vehicle M with respect to the traveling lane. Instead, the recognizer 130 may recognize a position and the like of the reference point of the host vehicle M with respect to either side end (a road section line or a road boundary) of the traveling lane as the relative position of the host vehicle M with respect to the traveling lane.

The recognizer 130 includes a parking space recognizer 132 to be described below, which is started in an autonomous parking event. Details of functions of the parking space recognizer 132 will be described below.

In principle, the action plan generator 140 travels on a recommended lane determined by the recommended lane determiner 61, and furthermore, generates a target trajectory in which the host vehicle M will automatically (without depending on an operation of the driver) travel to be able to cope with the vicinity situation of the host vehicle M. The target trajectory includes, for example, a speed element. For example, the target trajectory is expressed as a sequence of points (orbit points) to be reached by the host vehicle M. The orbit points are points to be reached by the host vehicle M for each predetermined traveling distance (for example, about several [m]) in a road distance, and separately from this, a target speed and a target acceleration for each predetermined sampling time (for example, about 0 commas [sec]) are generated as a part of the target trajectory. The orbit points may be positions to be reached by the host vehicle M at as a corresponding sampling time for each predetermined sampling time. In this case, the information on the target speed and the target acceleration is expressed by an interval between the orbit points.

The action plan generator 140 may set an automated driving event in generation of a target trajectory. Examples of the automated driving event include a constant-speed traveling event, a low-speed following traveling event, a lane change event, a branching event, a merging event, a takeover event, an autonomous parking event and the like. The action plan generator 140 generates a target trajectory in accordance with a started event.

The action plan generator 140 includes an autonomous parking controller 142 which is started when an autonomous parking event is executed. Details of functions of the autonomous parking controller 142 will be described below.

The second controller 160 controls the traveling drive force output device 200, the brake device 210, and the steering device 220 such that the host vehicle M passes through the target trajectory generated by the action plan generator 140 at a scheduled time.

Returning to FIG. 4, the second controller 160 includes, for example, an acquirer 162, a speed controller 164, and a steering controller 166. The acquirer 162 acquires information on the target trajectory (orbit points) generated by the action plan generator 140 and stores it in a memory (not shown). The speed controller 164 controls the traveling drive force output device 200 or the brake device 210 on the basis of a speed element associated with the target trajectory stored in the memory. The steering controller 166 controls the steering device 220 in accordance with a bending condition of the target trajectory stored in the memory. Processing of the speed controller 164 and the steering controller 166 is realized by, for example, a combination of feed forward control and feedback control. As an example, the steering controller 166 executes a combination of the feed forward control in accordance with curvature of a road in front of the host vehicle M and the feedback control based on a deviation from the target trajectory.

The traveling drive force output device 200 outputs a traveling drive force (torque) for a traveling of a vehicle to drive wheels. The traveling drive force output device 200 includes, for example, a combination of an internal combustion engine, an electric motor, a transmission, and the like, and an electronic control unit (ECU) that controls these. The ECU controls the constituents described above according to information input from the second controller 160 or information input from the driving operator 80.

The brake device 210 includes, for example, a brake caliper, a cylinder that transmits a hydraulic pressure to the brake caliper, an electric motor that generates a hydraulic pressure to the cylinder, and a brake ECU. The brake ECU controls the electric motor according to the information input from the second controller 160 or the information input from the driving operator 80 such that a brake torque associated with a braking operation is output to each wheel. The brake device 210 may include, as a backup, a mechanism that transmits the hydraulic pressure generated by an operation of the brake pedal included in the driving operator 80 to the cylinder via a master cylinder. The brake device 210 is not limited to the configuration described above and may be an electronically controlled hydraulic brake device that controls an actuator according to the information input from the second controller 160 and transmits the hydraulic pressure of the master cylinder to the cylinder.

The steering device 220 includes, for example, a steering ECU and an electric motor. The electric motor changes a direction of the steering wheel by, for example, applying a force to a rack and pinion mechanism. The steering ECU drives the electric motor and changes the direction of the steering wheel according to the information input from the second controller 160 or the information input from the driving operator 80.

[Autonomous Parking Event—at the Time of Entrance]

Figure 5:
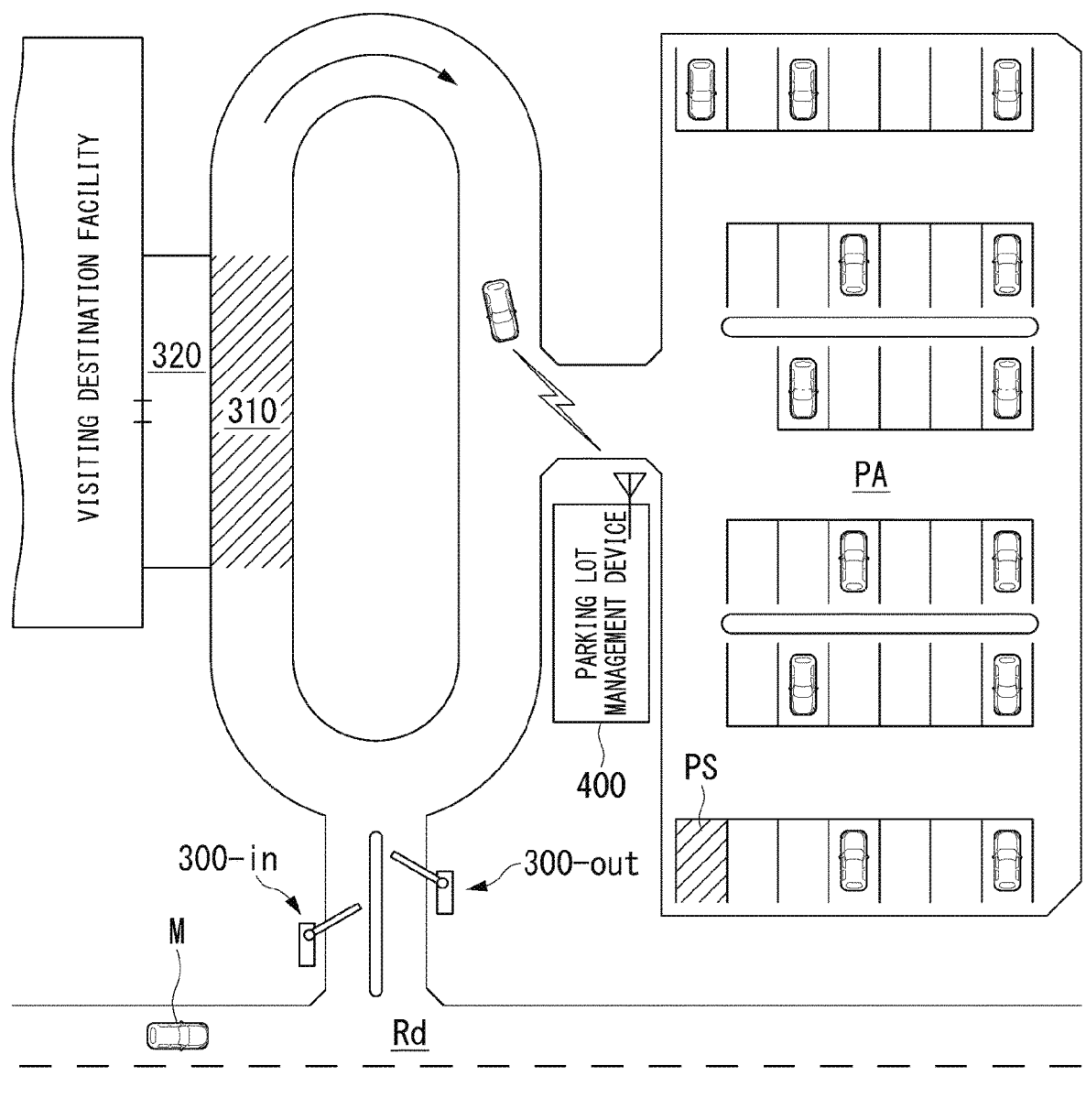
FIG. 5 is a diagram which schematically shows a scene in which an autonomous parking event is executed.

The autonomous parking controller 142 causes the host vehicle M to park in a parking space on the basis of, for example, information acquired from the parking lot management device 400 by the communication device 20. FIG. 5 is a diagram which schematically shows a scene in which an autonomous parking event is executed. In a route from a road Rd to a visiting destination facility, gates 300-in and 300-out are provided. The host vehicle M proceeds to a stop area 310 after passing through the gate 300-in by manual driving or automated driving. The stop area 310 faces a getting-on/off area 320 connected to the visiting destination facility. The getting-on/off area 320 is provided with an eave for avoiding rain and snow.

The host vehicle M starts an autonomous parking event in which unmanned (or manned) automated driving and moving to a parking space PS in a parking lot PA are performed after the occupant gets off the vehicle at the stop area 310. A start trigger of the autonomous parking event may be, for example, some operations performed by the occupant, or may be a reception of a predetermined signal wirelessly from the parking lot management device 400. The autonomous parking controller 142 controls the communication device 20 such that it transmits a parking request to the parking lot management device 400 when the autonomous parking event is started. Then, the host vehicle M moves from the stop area 310 to the parking lot PA according to a guidance of the parking lot management device 400 or while performing sensing by itself.

Figure 6:
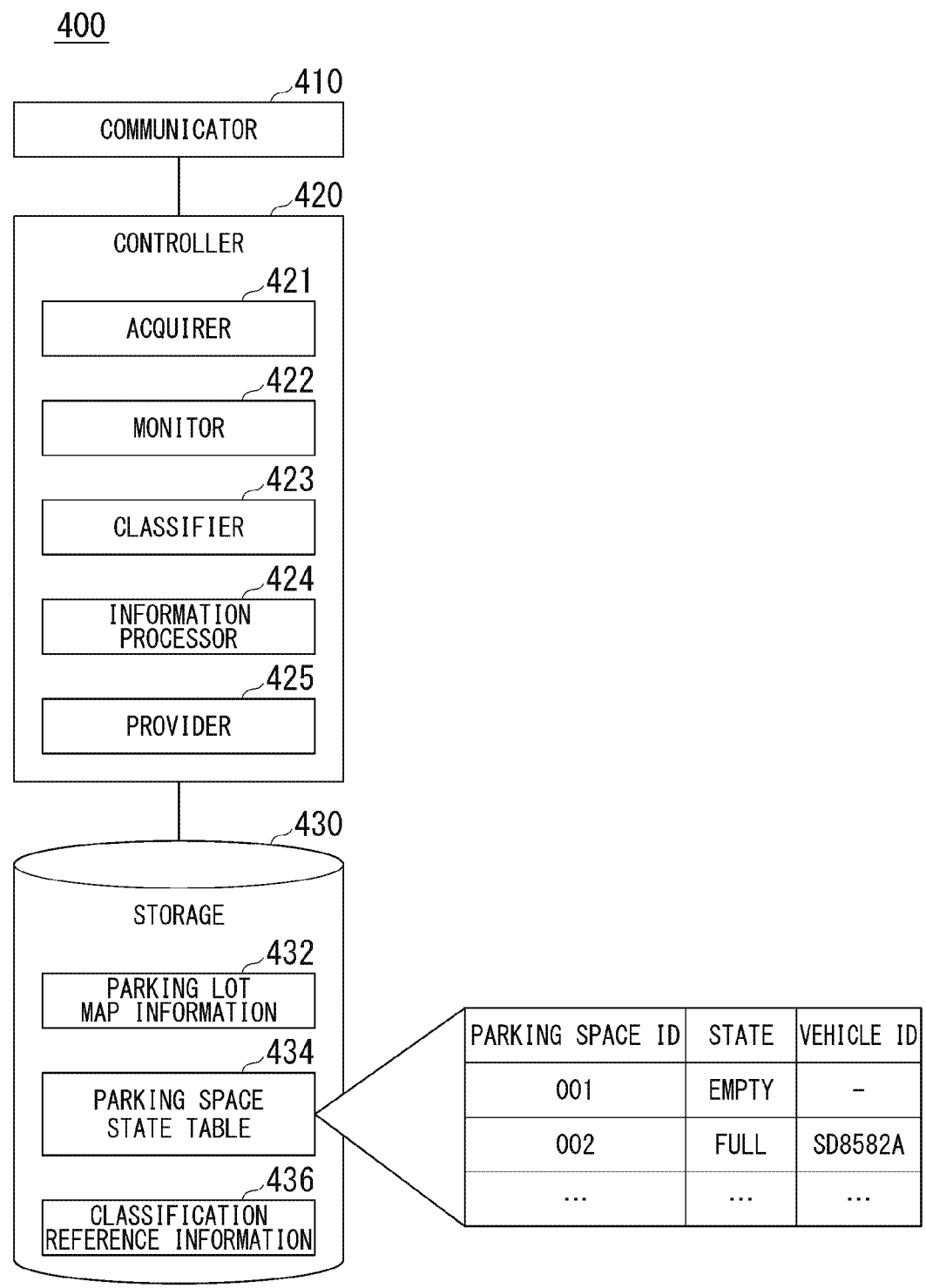
FIG. 6 is a diagram which shows an example of a configuration of a parking lot management device.

FIG. 6 is a diagram which shows an example of a configuration of the parking lot management device 400. The parking lot management device 400 includes, for example, a communicator 410, a controller 420, and a storage 430. The storage 430 stores information such as parking lot map information 432, a parking space state table 434, the classification reference information 436 (refer to FIG. 10). The communicator 410 wirelessly communicates with the host vehicle M and other vehicles.

The controller 420 includes, for example, an acquirer 421, a monitor 422, a classifier 423, an information processor 424, and a provider 425. The acquirer 421, the monitor 422, the classifier 423, the information processor 424, and the provider 425 are realized by a hardware processor such as a CPU executing a program (software). Some or all of these components may be realized by hardware (a circuit; including circuitry) such as a LSI, an ASIC, an FPGA, and a GPU, and may be realized by a cooperation of software and hardware. The program may be stored in advance in a storage device (a non-transitory storage medium) such as an HDD or a flash memory of the parking lot management device 400 and may be stored in a detachable storage medium such as a DVD or a CD-ROM and installed in the HDD or the flash memory of the parking lot management device 400 by the storage medium (the non-transitory storage medium) being attached to a drive device.

The acquirer 421 acquires a plurality of pick-up requests related to automated exit processing of causing a vehicle to exit from a parking lot and causing the occupant of the vehicle to get off at the getting-on/off area 320. The monitor 422 derives a degree of congestion in the getting-on/off area 320, the stop area 310, or near these areas on the basis of an image captured by the getting-on/off area camera 600. The monitor 422 extracts a person or a vehicle from the image captured by the getting-on/off area camera 600 according to image processing and derives the degree of congestion for the person and the vehicle on the basis of a result of the extraction.

The classifier 423 classifies a request acquired by the acquirer into first requests of first users who are permitted to use a specific parking space and second requests of second users who are not permitted to use the specific parking space.

The "specific parking space" is, for example, a parking space which can be only used by a specific user, or is preferentially used by the specific user. The specific parking space is, for example, a parking space with an international symbol mark (international symbol of access (ISA)), a mark indicating that a user of a stroller preferentially uses, a mark indicating that a pregnant woman preferentially uses, and the like. "Being permitted" includes that an authority has been granted, that the use is actually permitted by another person, that oneself estimates that the use is objectively permitted by another person, and the like.

The "first requests" are, for example, pick-up requests transmitted by the terminal device 500 (hereinafter, referred to as first terminal devices in some cases) held by the first users (or companions of the first users). The "second requests" are, for example, pick-up requests transmitted by the terminal device 500 (hereinafter, referred to as second terminal devices in some cases) held by the second users (or companions of the second users). In the following description, the first requests and the second requests are described as "pick-up requests" as long as there is no distinction between them.

The first user described above is not limited only to a user who is permitted to use the specific parking space and may include a user who rides in the same vehicle with a user (hereinafter, a specific user) who is permitted to use the specific parking space or a companion accompanying the specific user. That the user is the first user is, for example, stored in the storage 430 of the parking lot management device 400 in advance. The user may operate the terminal device 500 or a device provided in the facility to request another device such as the parking lot management device 400 to register that the user is the first user, or the user may request an administrator and the administrator who has received the request may operate another device and register that the user is the first user.

The information processor 424 may cause vehicles associated with terminal devices which are transmission sources of one or more of the first requests acquired by the acquirer 421 to perform automated exit processing such that the automated exit processing according to the one or more of the first requests is continuously executed, on the basis of a result of the classification performed by the classifier 423. To cause vehicles associated with terminal devices which are transmission sources of one or more of the first requests to perform automated exit processing such that automated exit processing is continuously executed is, for example, that the information processor 424 continuously performs automated exit processing on a vehicle associated with the terminal device 500 which is a transmission source of one or more of the first requests.

The provider 425 notifies the terminal device 500 which has transmitted the second request of information indicating that the first request has priority over the second request or information indicating that a start of the automated exit processing for the second request has been delayed by giving priority to the first request over the second request.

Returning to the description of the information processor 424, the information processor 424 guides the vehicle to the parking space PS on the basis of the information acquired by the communicator 410 and the information stored in the storage 430. The parking lot map information 432 is information that geometrically represents a structure of the parking lot PA. The parking lot map information 432 includes coordinates for each parking space PS. The parking space state table 434 is a table in which, for example, a state indicating whether the parking space PS is in an empty state or a full (parking) state and a vehicle ID that is identification information of a parking vehicle in the full state are associated with a parking space ID that is identification information of the parking space PS.

If the communicator 410 receives a parking request from a vehicle, the information processor 424 extracts a parking space PS which is in the empty state with reference to the parking space state table 434, acquires a position of the extracted parking space PS from the parking lot map information 432 and transmits a preferred route to the position of the acquired parking space PS to the vehicle using the communicator 410. The information processor 424 instructs a specific vehicle to stop or slow down when necessary on the basis of a positional relationship of a plurality of vehicles such that vehicles do not proceed to the same position at the same time.

In the vehicle that has received the route (hereinafter, referred to as the host vehicle M), the autonomous parking controller 142 generates a target trajectory based on the route. If a target parking space PS is approached, the parking space recognizer 132 recognizes a parking frame line or the like that partitions the parking space PS, and recognizes a detailed position of the parking space PS to provide it to the autonomous parking controller 142. The autonomous parking controller 142 corrects the target trajectory after receiving this and causes the host vehicle M to park in the parking space PS.

[Autonomous Parking Event—at the Time of Exit]

The autonomous parking controller 142 and the communication device 20 maintain an operating state even while the host vehicle M parks. The autonomous parking controller 142 causes a system of the host vehicle M to start and causes the host vehicle M to move to the stop area 310, for example, when the communication device 20 receives a pick-up request from a terminal device 500 of the occupant via the parking lot management device 400. That is, the autonomous parking controller 142 performs automated exit processing. At this time, the autonomous parking controller 142 controls the communication device 20 such that a take-off request is transmitted to the parking lot management device 400. The information processor 424 of the parking lot management device 400 instructs a specific vehicle to stop or slow down when necessary on the basis of the positional relationship of a plurality of vehicles such that the vehicles do not proceed to the same position at the same time just like at the time of entrance. If the host vehicle M is moved to the stop area 310 to allow the occupant to board the vehicle, the autonomous parking controller 142 stops operating, and thereafter, manual driving or automated driving performed by another functional part is started.

The autonomous parking controller 142 is not limited to the description above, and may find a parking space in the empty state by itself on the basis of a result of detection performed by the camera 10, the radar device 12, the finder 14, or the object recognition device 16 independently of communication and cause the host vehicle M to park in the found parking space.

[Classification Instruction Processing (Part 1)]

The parking lot management device 400 classifies a plurality of pick-up requests into a plurality of first requests of a plurality of first users who are permitted to use a specific parking space and one or more of the second requests of one or more of the second users who are not permitted to use the specific parking space, and, on the basis of a result of the classification, continuously issues an exit instruction to cause a vehicle subjected to automated exit processing in accordance with the first request to perform the automated exit processing such that the automated exit processing for the first request included in the plurality of first requests is continuously executed.

Figure 7:
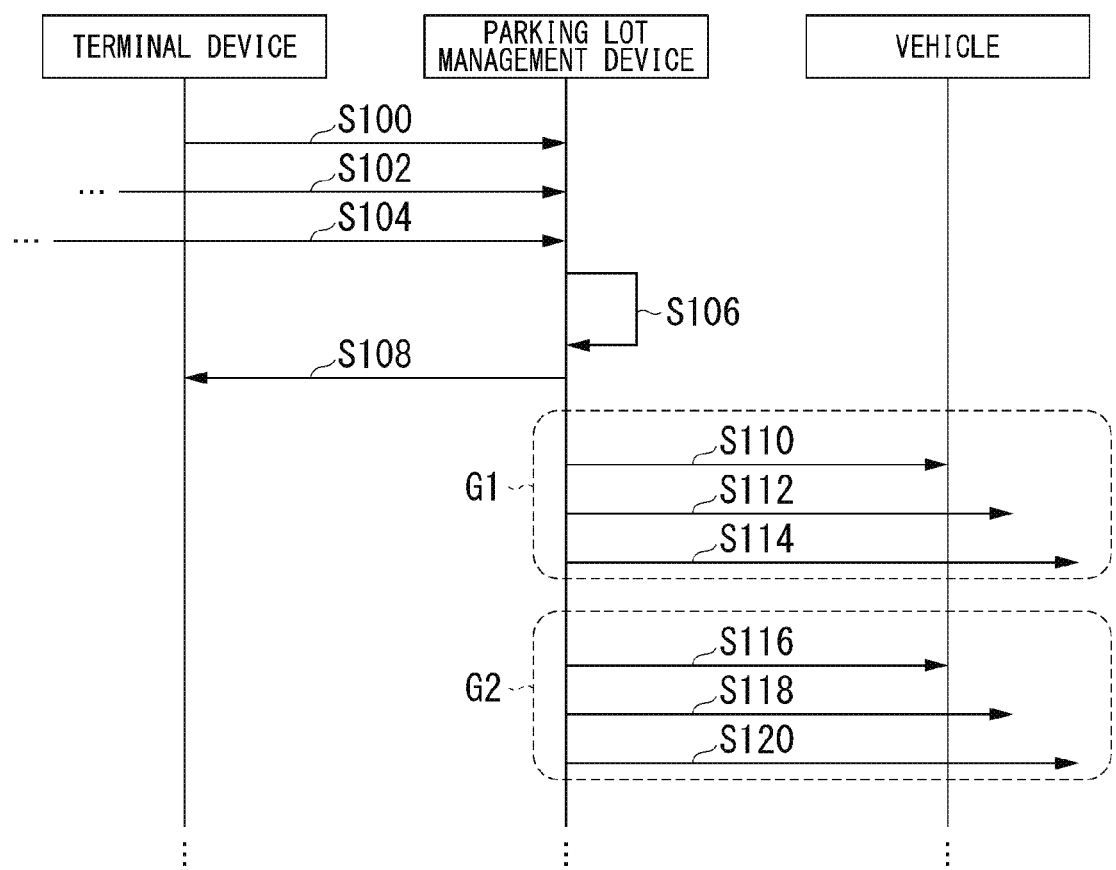
FIG. 7 is a sequence diagram which shows an outline of a flow of processing executed by the parking lot management system.

FIG. 7 is a sequence diagram which shows an outline of a flow of processing executed by the parking lot management system 1. First, a plurality of terminal devices 500 transmit pick-up requests to the parking lot management device 400, respectively (steps S100 to S104). The parking lot management device 400 acquires a plurality of pick-up requests transmitted by the plurality of terminal devices 500, and determines priorities of the pick-up requests on the basis of a result of classifying the acquired pick-up requests (step S106). Details of processing of step S106 and processing of steps S108 to S120 to be described below will be described below.

The parking lot management device 400 transmits information based on the priorities determined in step S106 to the terminal device 500 (step S108). For example, the parking lot management device 400 transmits information on an exit order and information indicating exit time and the like to the terminal device 500.

Next, the parking lot management device 400 transmits an exit instruction to the vehicle in accordance with a pick-up request to respond to the pick-up request according to the priorities determined in step S106 (S110 to S118). At this time, the parking lot management device 400 continuously issues an exit instruction to cause a vehicle (hereinafter, a first vehicle) subjected to automated exit processing in accordance with the first request to perform the automated exit processing such that the automated exit processing of the classified first request is continuously executed (steps S110 to S114). Thereafter, the parking lot management device 400 continuously issues an exit instruction to cause a vehicle (hereinafter, a second vehicle) subjected to automated exit processing in accordance with the second request to perform the automated exit processing such that the automated exit processing of the classified second request is continuously executed (steps S116 to S120). In this manner, the parking lot management device 400 groups the plurality of first requests, and issues exit instructions to the second vehicles after issuing exit instructions to the first vehicles.

Figure 8:
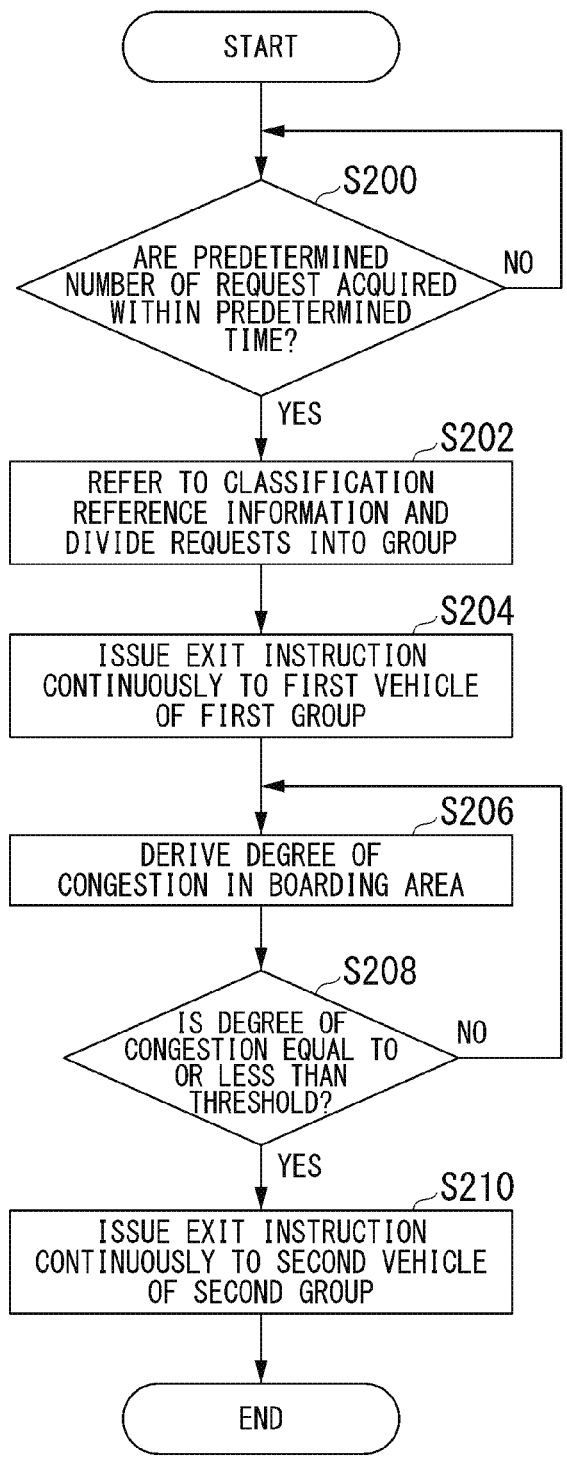
FIG. 8 is a flowchart which shows an example of a flow of processing executed by a parking lot management device.

FIG. 8 is a flowchart which shows an example of a flow of processing executed by the parking lot management device 400. First, the information processor 424 determines whether the acquirer 421 has acquired a predetermined number of pick-up requests within a predetermined time (step S200). FIG. 9 is a diagram which shows an example of content of information included in a pick-up request PR transmitted by the terminal device 500. For example, the pick-up request is information in which identification information (terminal device ID) of the terminal device 500 and information indicating a request type (for example, pick-up or parking) are associated with each other.

If it is determined that the acquirer 421 has acquired a predetermined number of pick-up requests within a predetermined time, the classifier 423 refers to the classification reference information 436 and divides the pick-up requests into groups (step S202). That is, when the acquirer 421 has acquired the predetermined number or more of pick-up requests within the predetermined time, the following processing (processing of continuously performing an exit instruction) is performed. FIG. 10 is a diagram which shows an example of content of the classification reference information 436. The classification reference information 436 is, for example, information in which a terminal device ID, a type of request, and a vehicle ID are associated with each other. The "group" is a first group that is a set of the first requests or a second group that is a set of the second requests. The classifier 423 classifies the pick-up requests acquired by the acquirer 421 into the first group and the second group. In the classification reference information 436, a vehicle having the vehicle ID associated with the terminal device ID included in a pick-up request PR is a vehicle associated with the pick-up request PR. In step S200, when a predetermined number of pick-up requests (for example, the first request or the second request) are acquired, processing of step S202 may be performed.

Next, the information processor 424 continuously issues exit instructions to the first vehicles of the first group (step S204). The term "continuously" means that exit instructions of the first vehicles associated with pick-up requests of the first group are performed without interposing exit instructions of the second vehicles associated with pick-up requests of the second group. That is, the information processor 424 does not interpose the exit instructions of the second vehicles between the exit instruction of a first vehicle and the exit instruction of another first vehicle. For example, the information processor 424 issues exit instructions to the first vehicles associated with the first requests such that users board the vehicles smoothly on the basis of states of the vehicles in the getting-on/off area 320 in order of times at which the first requests of the first group have been acquired.

Next, the monitor 422 derives the degree of congestion in the getting-on/off area 320 and the stop area 310 on the basis of the image captured by the getting-on/off area camera 600 (step S206). Next, the information processor 424 determines whether the degree of congestion derived by the monitor 422 is equal to or less than a threshold (step S208). The degree of congestion is, for example, a degree of congestion in the stop area 310, the getting-on/off area 320, and in the vicinity of these areas. For example, (1) when a number of vehicles equal to or more than a threshold is present at the stop area 310 and in the vicinity of the stop area 310, the degree of congestion is determined to be high. For example, (2) when the number of users estimated to be waiting to board vehicles by automated exit processing at the getting-on/off area 320 or in the vicinity of the getting-on/off area 320 is equal or more than threshold, the degree of congestion is determined to be high. When the number of users estimated to be on-board at the getting-on/off area 320 or in the vicinity of the getting-on/off area 320 is equal to or more than a threshold, the degree of congestion is determined to be high. When both (1) and (2) described above are satisfied, the degree of congestion may be determined to be high.

With the determination as described above, when the first vehicle which has exited according to the first request is present in the getting-on/off area 320, exits of the second vehicles of the second group are curbed and congestion in the stop area 310 or a road passing through the stop area 310 is curbed.

When it is determined that the degree of congestion is equal to or less than the threshold in step S208 (when it is determined that the degree exceeds the threshold), the procedure returns to the processing of step S206. When it is determined that the degree of congestion is equal to or less than the threshold in step S208, the information processor 424 continuously issues exit instructions to the second vehicles of the second group (step S210). The exit instructions may also be issued, for example, in order in which pick-up requests have been transmitted without a distinction between the first group and the second group in step S210. As a result, processing of one routine of this flowchart ends.

Figure 11:
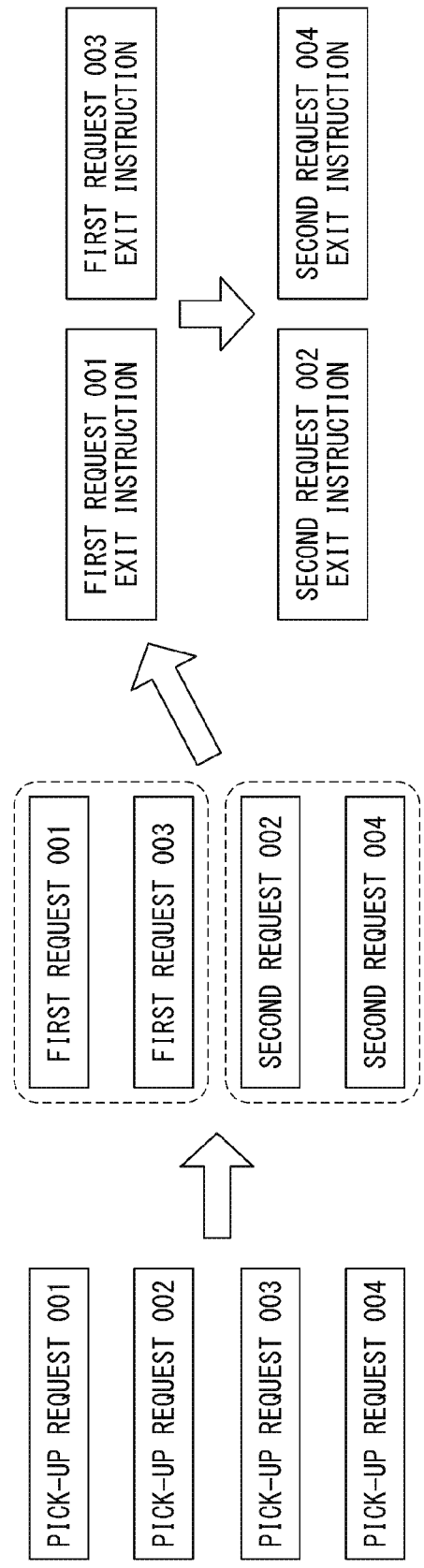
FIG. 11 is a diagram which conceptually shows a state in which a pick-up request transmitted to a user is processed.

FIG. 11 is a diagram which conceptually shows a state in which a pick-up request transmitted to the user is processed. For example, when a predetermined number or more of pick-up requests are transmitted within a predetermined time, the classifier 423 classifies the plurality of pick-up requests into the first group and the second group. Then, the information processor 424 continuously issues exit instructions of the second group after continuously issuing exit instructions of the first group.

Figure 12:
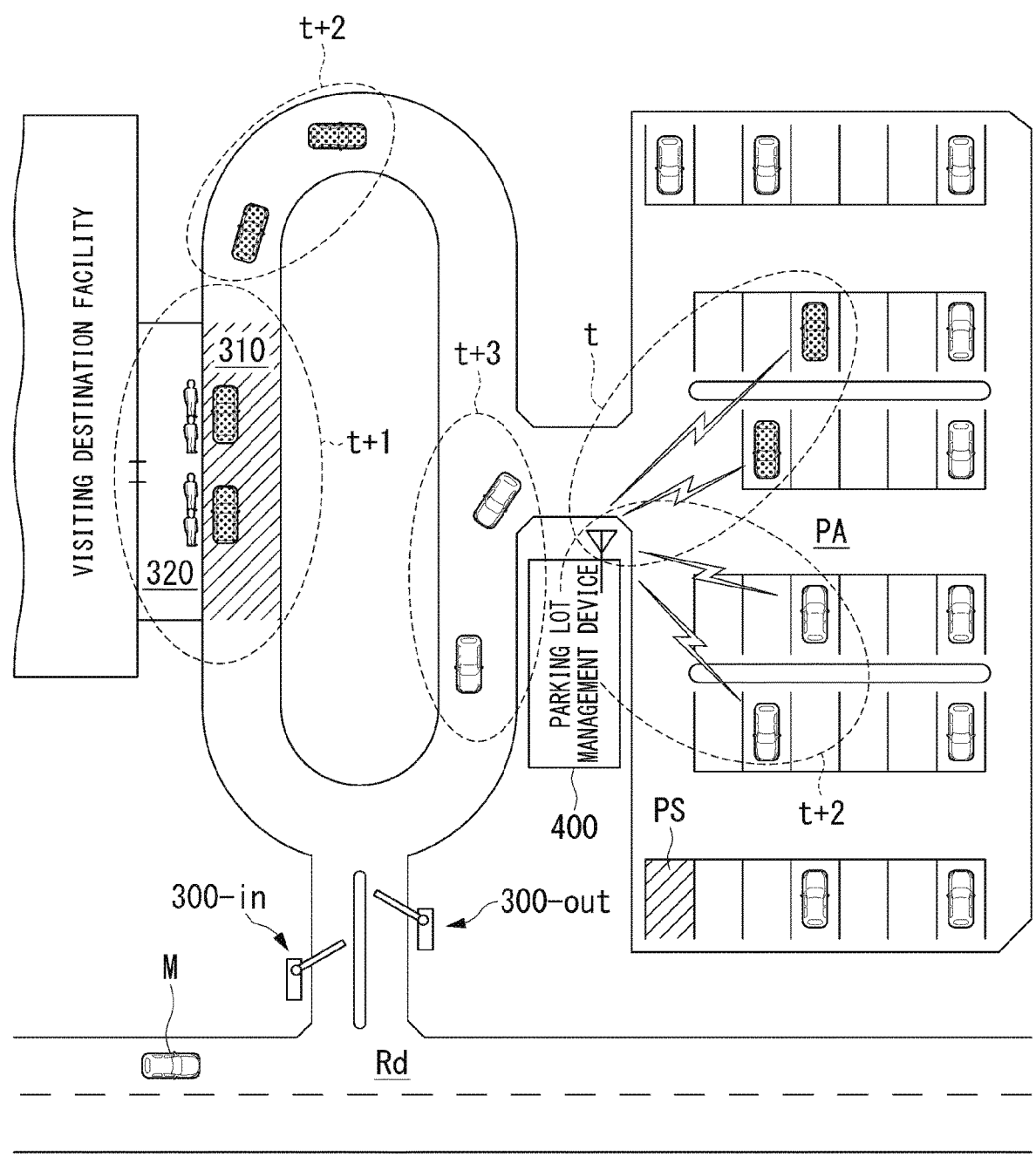
FIG. 12 is a diagram for describing an exit instruction transmitted by the parking lot management device and a behavior of a vehicle according to the exit instruction.

FIG. 12 is a diagram for describing an exit instruction transmitted by the parking lot management device 400 and a behavior of a vehicle according to the exit instruction. At a time t, if the parking lot management device 400 issues exit instructions to the first vehicles of the first group, the first vehicles start traveling toward the getting-on/off area 320. At a time t+1, if the first vehicles have reached the stop area 310, the occupants board the first vehicles.

At a time t+2, if the occupant boards the first vehicle and the first vehicle leaves the stop area 310, the degree of congestion in the stop area 310 or the like is equal to or less than the threshold. Then, the parking lot management device 400 issues exit instructions to the second vehicles of the second group. At a time t+3, the second vehicles of the second group start traveling toward the getting-on/off area 320. Thereafter, the second vehicles of the second group allow the occupants to board the vehicles in the stop area 310. The exit instructions to the second vehicles may be issued between the time t+1 and the time t+2 (for example, the exit instructions may be issued to the second vehicles such that the second vehicles reach the getting-on/off area 320 at a timing at which the first vehicles have left the getting-on/off area 320).

In this manner, the controller 420 classifies users (or vehicles) into groups on the basis of attributes of the users, issues an exit instruction to each vehicle of the classified group, and thereby the user or the administrator can perform an appropriate operation. For example, first vehicles of the first group for which a relatively long time is taken to board vehicles are caused to exit together, and second vehicles of the second group for which a relatively long time is not taken to board vehicles are caused to exit together, and thereby timings at which the plurality of vehicles leave the stop area 310 are made close to each other, and the behavior of the vehicles in the vicinity of the stop area 310 or an exit management of the vehicles in the parking lot is simplified. Accordingly, automated exit processing for the pick-up requests is performed smoothly. As a result, the user or the administrator performs an appropriate operation.

In the processing described above, when the acquirer 421 has acquired a predetermined number or more of first requests within a predetermined time, the information processor 424 may cause vehicles associated with terminal devices which are transmission sources of one or more of the first requests to continuously perform automated exit processing. In the processing described above, when the acquirer 421 has acquired a predetermined number or more of second requests within a predetermined time, the information processor 424 may cause vehicles associated with terminal devices which are transmission sources of the one or more of the second requests to continuously perform automated exit processing.

[Classification Instruction Processing (Part 2)]

Figure 13:
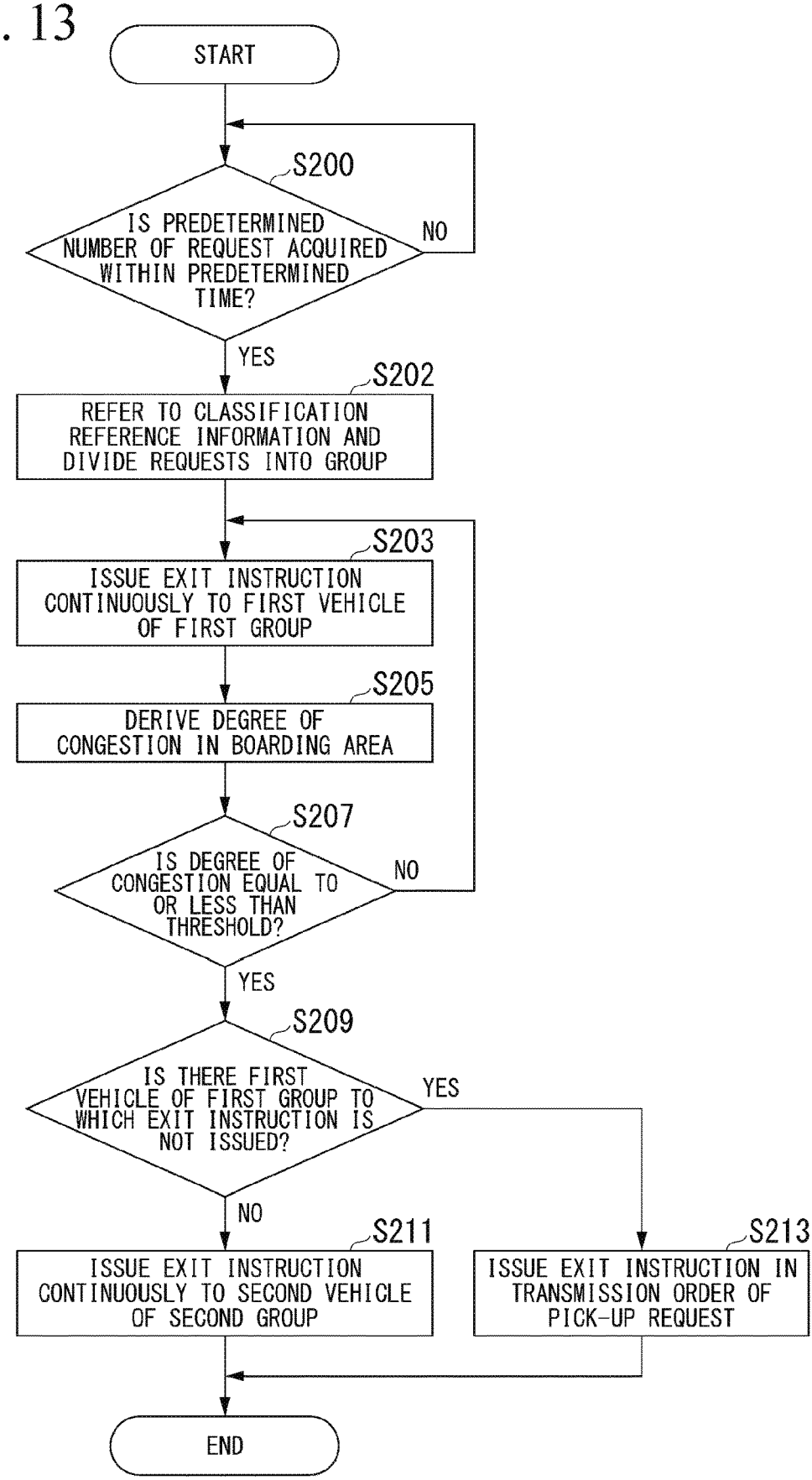
FIG. 13 is a flowchart which shows another example of the flow of the processing executed by the parking lot management device.

The classification instruction processing described above may be executed as in processing of a flowchart of FIG. 13. FIG. 13 is a flowchart which shows another example of the flow of the processing executed by the parking lot management device 400. Processing of steps S200 and S202 of FIG. 13 is the same as the processing of steps S200 and S202 of FIG. 8, and thus description thereof will be omitted.

After the processing of step S202, the information processor 424 extracts a predetermined number (a plurality of or one) of first vehicles among the first group, and issues exit instructions to the extracted first vehicles (step S203). Next, the monitor 422 derives the degree of congestion in the getting-on/off area 320 and the stop area 310 on the basis of the image captured by the getting-on/off area camera 600 (step S206). Next, the information processor 424 determines whether the degree of congestion derived by the monitor 422 is equal to or less than the threshold (step S207).

When it is determined that the degree of congestion is equal to or less than the threshold in step S207 (when it is determined that the degree of congestion exceeds the threshold), the procedure returns the processing of step S203. In this case, the information processor 424 extracts first vehicles different from the first vehicles to which exit instructions are issued in step S203 and issues exit instructions to the extracted different first vehicles.

When it is determined that the degree of congestion is equal to or less than the threshold in step S207, the information processor 424 determines whether there are first vehicles of the first group to which exit instructions are not issued (step S209). When it is determined that there are no first vehicles of the first group to which exit instructions are not issued, the information processor 424 continuously issues exit instructions to second vehicles of the second group (step S211).

When it is determined that there are first vehicles included in the first group to which exit instructions are not issued, the information processor 424 issues exit instructions to the vehicles on the basis of an order in which pick-up requests are transmitted without a distinction between the first vehicles and the second vehicles (step S213). In this manner, the information processor 424 stops continuously issuing exit instructions to the first vehicles when the degree of congestion in the getting-on/off area 320 is equal to or less than the threshold. As a result, processing of one routine of this flowchart ends.

As described above, the parking lot management device 400 issues exit instructions to the first vehicles to cause the first vehicles to continuously exit when the degree of congestion in the stop area 310 exceeds the threshold and issues exit instructions to vehicles on the basis of pick-up requests without considering the attributes of the vehicles (users) when the degree of congestion in the stop area 310 is equal to or less than the threshold. For this reason, it is possible to perform exit processing in accordance with a situation of the facility. For example, when there is a congestion in the stop area 310 and the like, the users can quickly board the vehicles by causing the first vehicles to exit together to prompt efficient exit processing, and thereby the satisfaction levels of the users are improved. For example, when there is no congestion in the stop area 310 or the like, there is a small effect on congestion even if exit instructions are issued to vehicles on the basis of pick-up requests, and thereby the satisfaction levels of the users are improved by performing exit processing based on the pick-up request. As a result, the user or the administrator can perform an appropriate operation.

In each classification instruction processing described above, it is assumed that the first vehicles of the first group are preferentially caused to exit over the second vehicles of the second group, but, instead, the second vehicles of the second group may be preferentially caused to exit over the first vehicles of the first group. For example, when the number of the first vehicles is larger than the number of the second vehicles by a predetermined number or more, the second vehicles may be preferentially caused to exit.

[Notification Processing]

When the first vehicles of the first group are preferentially caused to exit, the provider 425 notifies first terminal devices held by the first users of information indicating that the first request is given priority over the second request or information indicating that the start of automated exit processing for the second request will be delayed by giving priority to the first request over the second request. The provider 425 provides second terminal devices with information for inquiring whether to cancel the second request after the notification described above.

[Flowchart]

Figure 14:
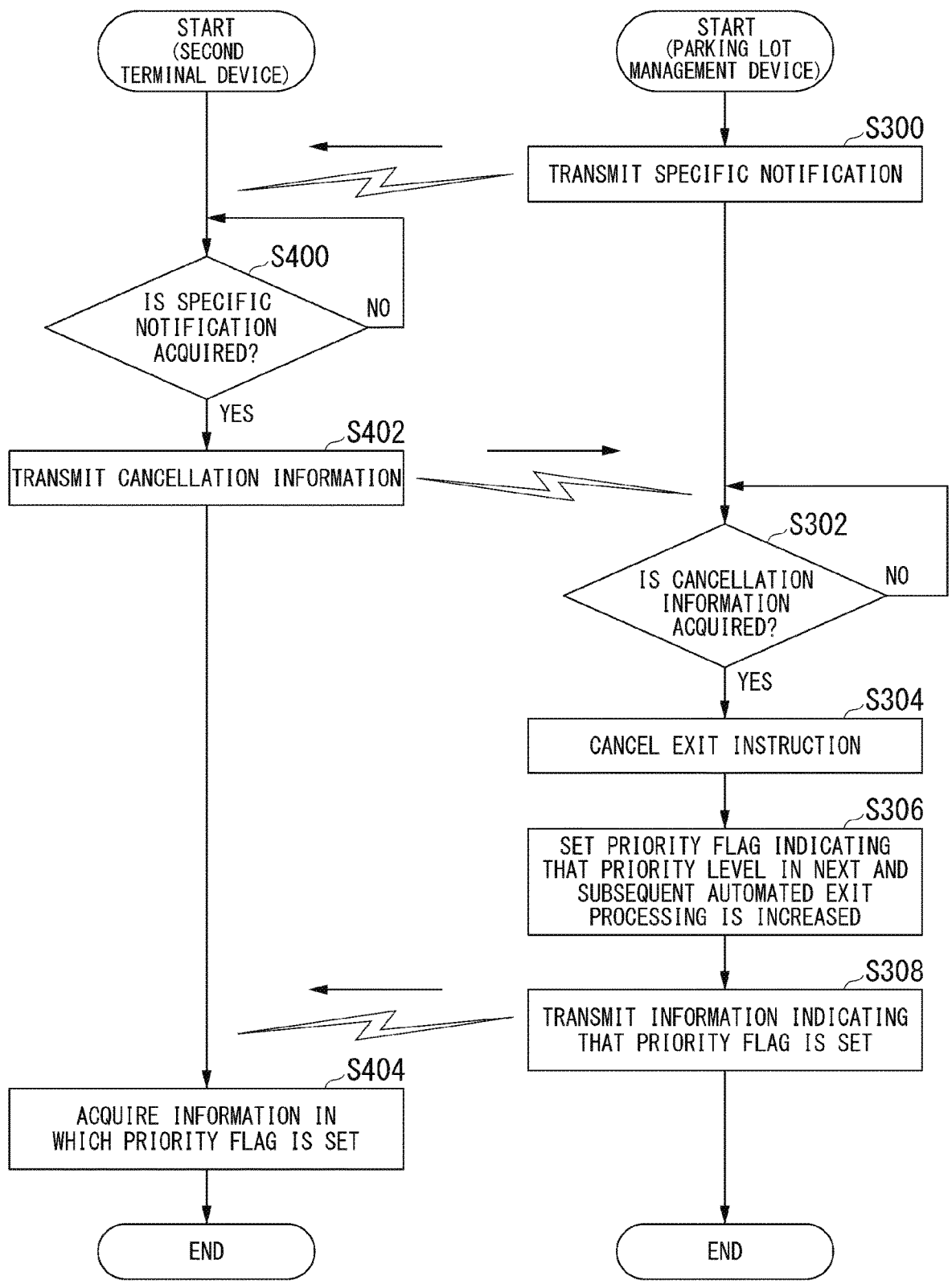
FIG. 14 is a flowchart which shows an example of a flow of processing executed by the parking lot management device and a second terminal device.

FIG. 14 is a flowchart which shows an example of a flow of processing executed by the parking lot management device 400 and the second terminal device. The present processing is, for example, processing executed after it is determined that the first vehicle of the first group is caused to exit continuously. For example, the present processing is processing executed when processing of step S204 (or step S203) of FIG. 8 is performed.

First, the provider 425 notifies the terminal device 500 of information indicating that the first vehicles of the first group will be caused to preferentially exit and information on content inquiring whether to cancel exits of the second vehicles (hereinafter, these types of information are referred to as "specific notification") (step S300).

The second terminal devices determine whether the specific notifications have been acquired (step S400). When users of the second terminal devices select to cancel the exits by performing a predetermined operation after the specific notifications are acquired, the second terminal devices transmit cancellation information indicating that the exits are cancelled to the parking lot management device 400 (step S402).

Next, the information processor 424 of the parking lot management device 400 determines whether the cancellation information has been acquired (step S302). When the cancellation information has been acquired, the information processor 424 deletes second requests having instructions for cancellation from a list for performing exit instructions, and cancels the second requests (step S304).

Next, the information processor 424 sets priority flags for the second users, which indicate that priority levels of the second requests transmitted in the next and subsequent automated exit processing by the second users having cancelled the second requests are to be increased (step S306). An increase in priority level means that a corresponding pick-up request is preferentially processed over other pick-up requests (pick-up requests whose transmission timings are earlier than a transmission timing of the corresponding pick-up request). If the priority level is increased, a vehicle associated with the pick-up request is caused to exit and a user who has transmitted the corresponding pick-up request can board the vehicle earlier than users who have transmitted other requests.

For example, the information processor 424 sets a priority flag associated with a terminal device ID. FIG. 15 is a diagram which shows an example of content of priority flag information 438 in which terminal device IDs and priority flags are associated with each other. The priority flag information 438 is, for example, stored in the storage 430 of the parking lot management device 400. A priority flag may be effective in automated exit processing in a parking lot managed by the parking lot management device 400, or may be effective in automated exit processing in a parking lot which is not managed by the parking lot management device 400. For example, the priority flag may also be effective within a range of a parking lot operated by the administrator who operates the parking lot of the present embodiment. In this case, the priority flag information is shared between the parking lot management device 400 and another parking lot management device. A priority level such as priority levels A to C may be associated with the priority flag. As the priority level increases, processing of a pick-up request of the priority level is given greater priority.

Next, the provider 425 transmits information indicating that the priority flag is set to the second terminal device (step S308). Next, the second terminal device acquires the information indicating that the priority flag is set, which is transmitted in step S308 (step S404). This information is, for example, displayed on a display of the second terminal device. As a result, processing of one routine of this flowchart ends.

As described above, since the second user can easily recognize that automated exit processing of the first vehicle of the first user who is permitted to use a specific parking space is preferentially performed, a sense of satisfaction of the user is improved. The second user is given an authority to preferentially perform automated exit processing in the next and subsequent automated exit processing, and thereby the satisfaction level of the user is improved.

[Priority Processing for Preferentially Performing Exit Instruction]

The parking lot management device 400 preferentially performs an exit instruction associated with the second request of the second user of the second terminal device which has transmitted cancellation information in next and subsequent automated exit processing.

Figure 16:
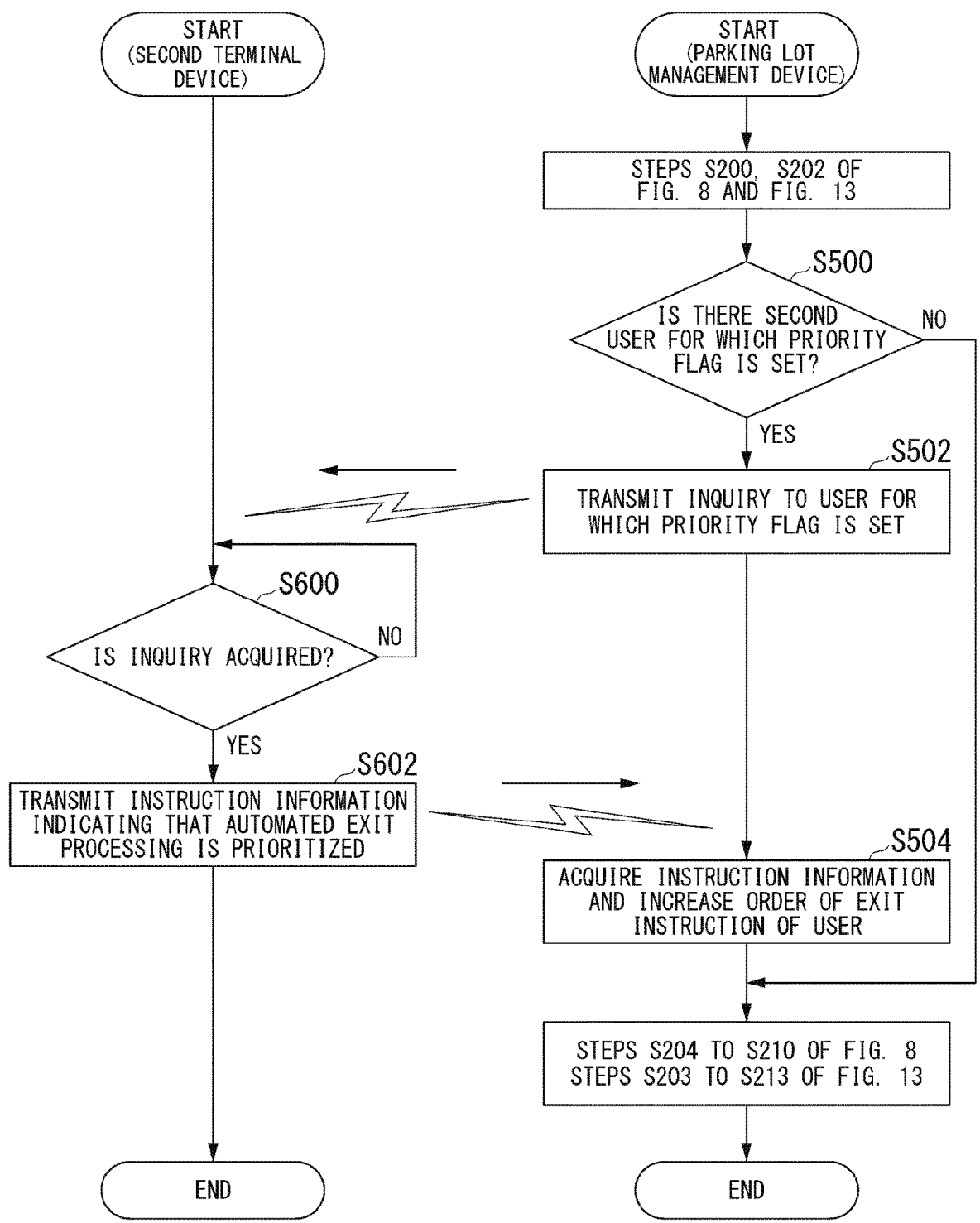
FIG. 16 is a flowchart which shows an example of a flow of priority processing executed by the parking lot management device.

FIG. 16 is a flowchart which shows an example of a flow of priority processing executed by the parking lot management device 400. First, the parking lot management device 400 executes processing of steps S200 and S202 of FIG. 8 or FIG. 13.

Next, the information processor 424 refers to the priority flag information 438 and determines whether there is a second user for which the priority flag is set (step S500). If there is a second user for which the priority flag is set, the provider 425 transmits inquiry information for inquiring whether to cause the second user for which the priority flag is set to prioritize automated exit processing to the second terminal device (step S502).

When the second terminal device has acquired the inquiry information, the inquiry information is caused to be displayed on a touch panel of the second terminal device (step S600). If an operation for causing the second user to prioritize automated exit processing is performed on the second terminal device, the second terminal device transmits instruction information indicating that automated exit processing is prioritized to the parking lot management device 400 (step S602).

Next, if the instruction information is acquired, the information processor 424 increases the order of exit instructions of the second users (step S504) and performs processing of step S204 and thereafter of FIG. 8 or processing of step S203 and thereafter of FIG. 13. The term "increase" means, for example, that the information processor 424 performs processing of including second requests in the first group or that the information processor 424 rearranges an order of requests such that the second requests are earlier than the first requests of the first group. For example, as a priority level set in a priority flag increases, an order in which automated exit processing is performed is moved up.

Figure 17:
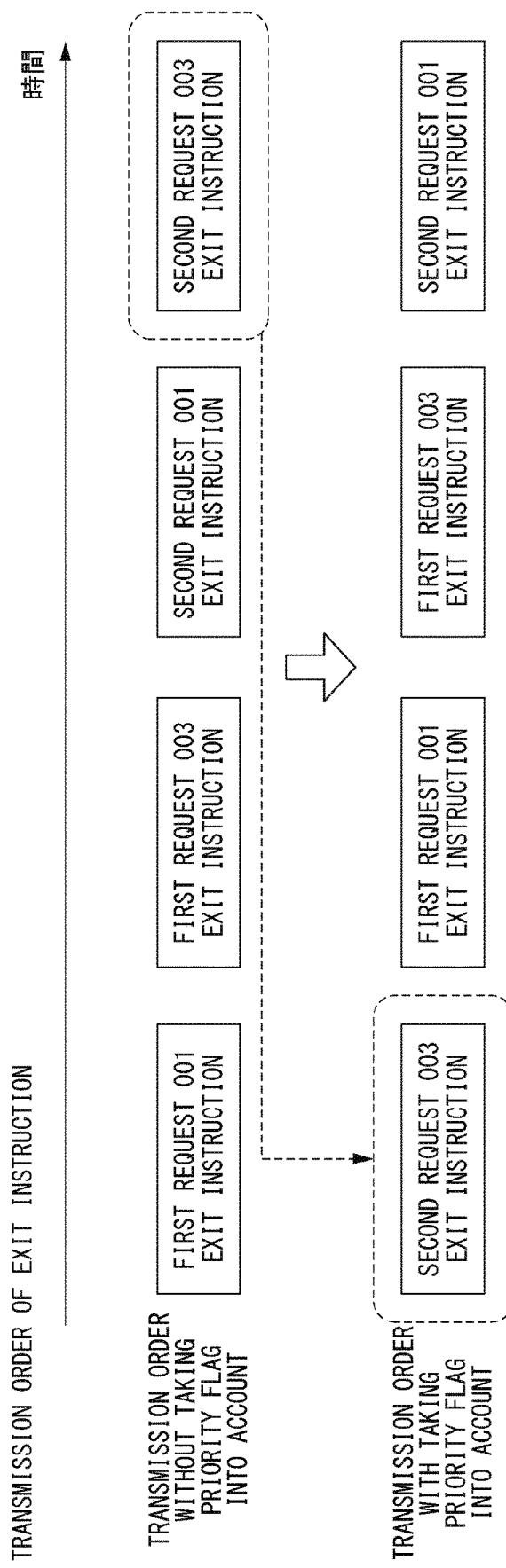
FIG. 17 is a conceptual diagram of a scene in which a second request is rearranged before a first request by instruction information.

FIG. 17 is a conceptual diagram of a scene in which the second requests are rearranged earlier than the first requests according to the instruction information. For example, automated exit processing of a second request 003 has been scheduled to be performed after automated exit processing of the first requests, but the order is rearranged such that the automated exit processing of the second request 003 is performed earlier than the automated exit processing of the first requests according to the instruction information. Then, the processing of steps S204 to S210 of FIG. 8 or the processing of steps S203 to S213 of FIG. 13 is performed.

As described above, the user can move up the order of automated exit processing on the basis of the instruction information, and thereby the convenience of the user is improved.

In the processing of the flowchart described above, when the user does not desire to move up the order in which automated exit processing is performed, that is, when the second terminal device does not transmit the instruction information, the user can instruct an order of next and subsequent automated exit processing to be moved up. As described above, the user can designate a move-up in the order at a desired timing.

In the processing described above, it is assumed that the parking lot management device 400 sets priority flags in the priority flag information 438 and refers to the priority flag information 438 to rearrange the order of automated exit processing, but, instead of this, the second terminal device (the parking application 508 or the controller 504) may set the priority flags. For example, the parking lot management device 400 may transmit request information requesting to set a priority flag to the second terminal device when an exit instruction is cancelled in step S304 of FIG. 14. The second terminal device causes the priority flag to be stored in the storage 506 when the request information is acquired.

Figure 18:
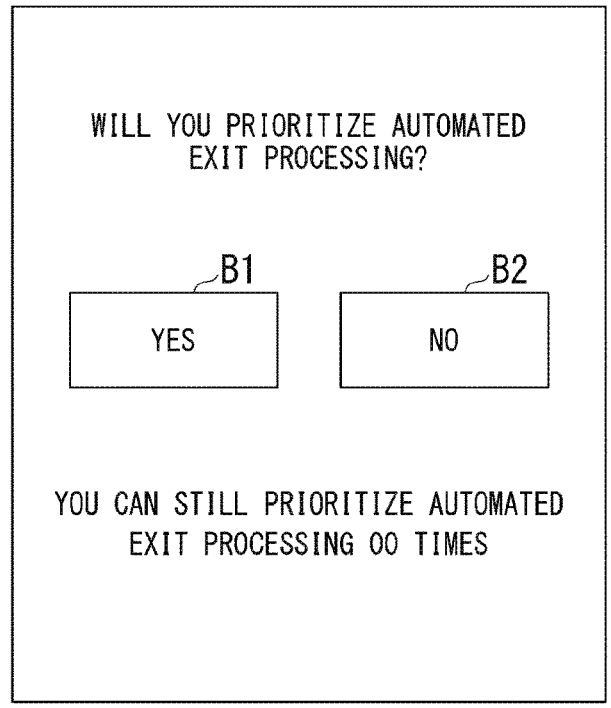
FIG. 18 is a diagram which shows an example of an image.

Then, when the second user transmits a second request, the second terminal device (the controller 504 or the parking application 508) causes an image IM1 inquiring of a use of the priority flag to be displayed on a touch panel when the priority flag is stored in the storage 506. FIG. 18 is a diagram which shows an example of the image IM1. For example, the image IM1 includes information for inquiring whether to prioritize automated exit processing, a decision button B1 for deciding to prioritize automated exit processing, a decision button B2 for deciding not to prioritize automated exit processing, information indicating the number of times automated exit processing can be prioritized, and the like. For example, if the user operates the decision button B1, the second terminal device transmits the second request and information indicating that the priority level of the second request is to be increased to the parking lot management device 400. The parking lot management device 400 increases the priority level of the second request on the basis of the information transmitted by the parking application 508.

As described above, the information on a priority level on the parking application 508 side is managed, and thereby a processing load of the parking lot management device 400 is reduced. When the second vehicle is prioritized, the information described above may be provided to the first user and the same processing may be performed.

According to the first embodiment described above, the parking lot management device 400 continuously perform automated exit processing according to the first request such that the automated exit processing for the first request is continuously executed, on the basis of a result of the classification by the classifier 423, and thereby the user or the administrator can perform an appropriate operation.

Second Embodiment

Hereinafter, a second embodiment will be described. In the second embodiment, the parking lot management device 400 adjusts the order of automated exit processing for the first request on the basis of a desire level set by the first user. Hereinafter, a difference from the first embodiment will be mainly described.

In the second embodiment, the first terminal device (the controller 504 or the parking application 508) transmits a pick-up request and a desire level to the parking lot management device 400. A desire level is a level (for example, "high," "medium," or "low") of desire for preferentially performing automated exit processing. For example, a desire level "high" is a desire level in which the desire is higher than heights of other desires. For example, a desire level "medium" is a desire level in which the desire level is the highest next to the desire level "high." For example, a desire level of "low" is a desire level in which the desire is lower than other desires.

Figure 19:
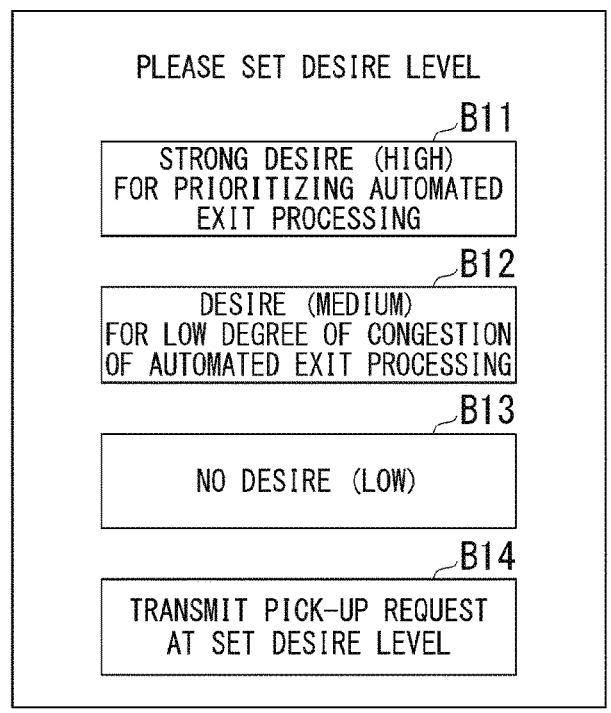
FIG. 19 is a diagram which shows an example of an image displayed on a touch panel of a first terminal device.

FIG. 19 is a diagram which shows an example of an image IM2 displayed on a touch panel of the first terminal device. In the image IM2, for example, setting buttons B11 to B13 for setting a desire level and an instruction button B14 for instructing a transmission of a pick-up request at a set desire level to the parking lot management device 400 are set. For example, a setting button B11 is a button for setting a strong desire (the desire level "high") for prioritizing automated exit processing. For example, a setting button B12 is a button for setting a desire (the desire level "medium") for prioritizing automated exit processing if the degree of congestion of automated exit is low. The low degree of congestion means that the number of pick-up requests (first requests) transmitted within a predetermined time is equal to or less than a threshold, or that the number of vehicles stopping in the stop area 310 is equal to or less than a predetermined number. For example, a setting button B13 is a button for setting no desire (the desire level "low") for prioritizing automated exit processing.

For example, if any one of the setting buttons B11 to B13 is operated and the user operates the instruction button B14 after the desire level is set, corresponding information in which the pick-up requests are associated with the desire levels is transmitted to the parking lot management device 400. The parking lot management device 400 acquires corresponding information PRα transmitted to the first terminal device. FIG. 20 is a diagram which shows an example of the corresponding information PRα.

[Flowchart]

Figure 21:
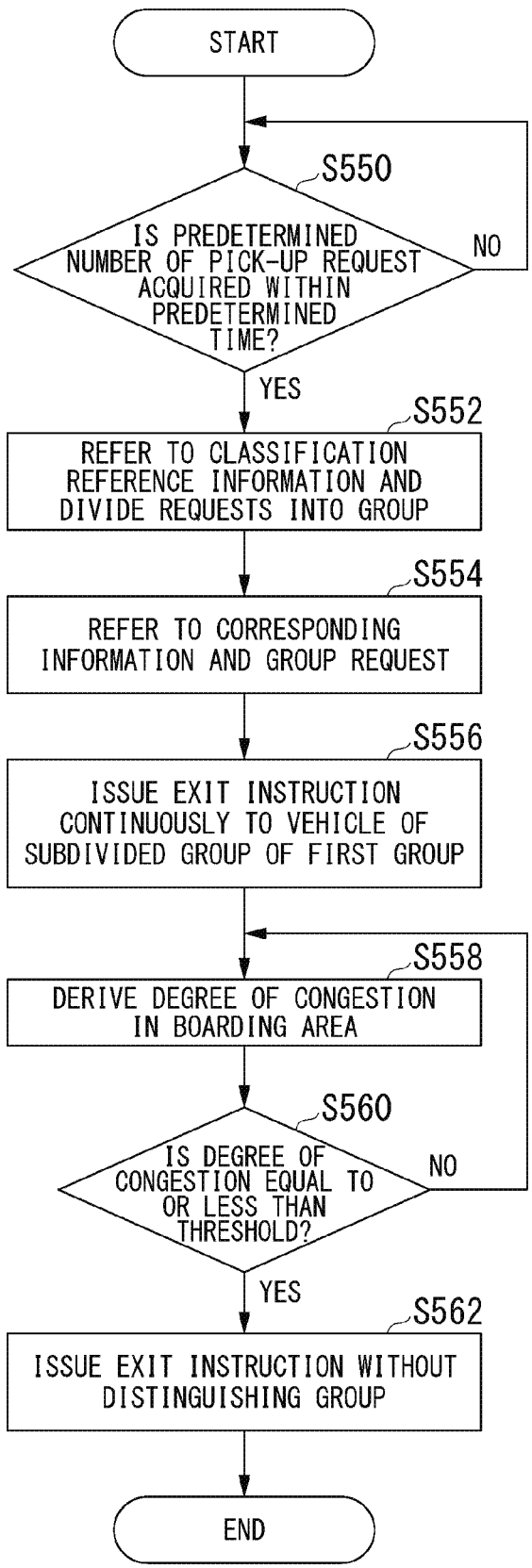
FIG. 21 is a flowchart which shows an example of a flow of processing executed by a parking lot management device according to a second embodiment.

FIG. 21 is a flowchart which shows an example of a flow of processing executed by the parking lot management device 400 of the second embodiment. Processing of steps S550, S552, and S558 to S562 of FIG. 21 is the same as the processing of steps S200, S202, and S206 to S210 of FIG. 8, and thus description thereof will be omitted.

After processing of step S552, the information processor 424 refers to the corresponding information PRα and groups first requests included in the first group on the basis of a desire level (step S554). For example, the information processor 424 groups the first requests for each desire level, such as a group with a high desire level, a group with a medium desire level, and a group with a low desire level. The groups classified in this manner are referred to as "subdivided groups."

Next, the information processor 424 performs an exit instruction to cause a subdivided group including a first request of a user with a high desire level among a plurality of subdivided groups to preferentially automatically exit on a corresponding first vehicle (step S556). For example, the exit instruction is continuously performed in order of the group with a high desire level, the group with a medium desire level, and the group with a low desire level.

The exit instruction of the group whose desire level is not high (for example, the group with a low desire level) among the subdivided groups may be performed after the exit instruction of the second group is performed. When desire levels are associated with the pick-up requests transmitted by the second terminal devices, the group with a high desire level for the second request may be preferentially caused to exit over the group whose desire level is not high among the subdivided groups of the first requests.

After the processing of step S556, processing of steps S558 to S562 is performed. As a result, processing of one routine of this flowchart ends.

When processing of the second embodiment is applied to the processing of the flowchart of FIG. 13, processing of steps S554 and S556 of FIG. 21 is performed and processing of step S205 and subsequent steps is performed after the step S202 of FIG. 13. When a negative determination is made in step S207, the procedure returns the processing of step S556.

According to the second embodiment described above, the parking lot management device 400 acquires information indicating a first request and a desire level related to the first request from the first terminal device held by the first user and adjusts a priority level of the first request on the basis of the acquired desire level, and thereby it is possible to realize an exit matching a user's wish.

Third Embodiment

Hereinafter, a third embodiment will be described. In the third embodiment, the parking lot management device 400 changes an order of exit instructions to cause vehicles subjected to automated exit processing according to pick-up requests to perform the automated exit processing on the basis of position information of an assistant. Hereinafter, a difference from the first embodiment will be mainly described.

An "assistant" is, for example, a person who assists a user of a facility. The "assistant" is, for example, a person who assists the user in boarding the vehicle or loading luggage onto the vehicle in the getting-on/off area 320, so-called an usher or a doorman.

The "position information of an assistant" is information for deriving the number of assistants present in the getting-on/off area 320. The position information of an assistant includes a position in which an assistant is actually disposed, a position in which an assistant is estimated to be disposed, and the like. Hereinafter, the position information of an assistant will be described as schedule information of an assistant disposed in the getting-on/off area 320. The schedule information of an assistant is information indicating the number of assistants for each time zone, who are disposed in the getting-on/off area 320. The schedule information is, for example, stored in the storage 430 of the parking lot management device 400.

The parking lot management device 400 may analyze an image captured by an imager which captures an image of the getting-on/off area 320, and may acquire the number of assistants in real time or may derive the number of assistants on the basis of another method.

Figure 22:
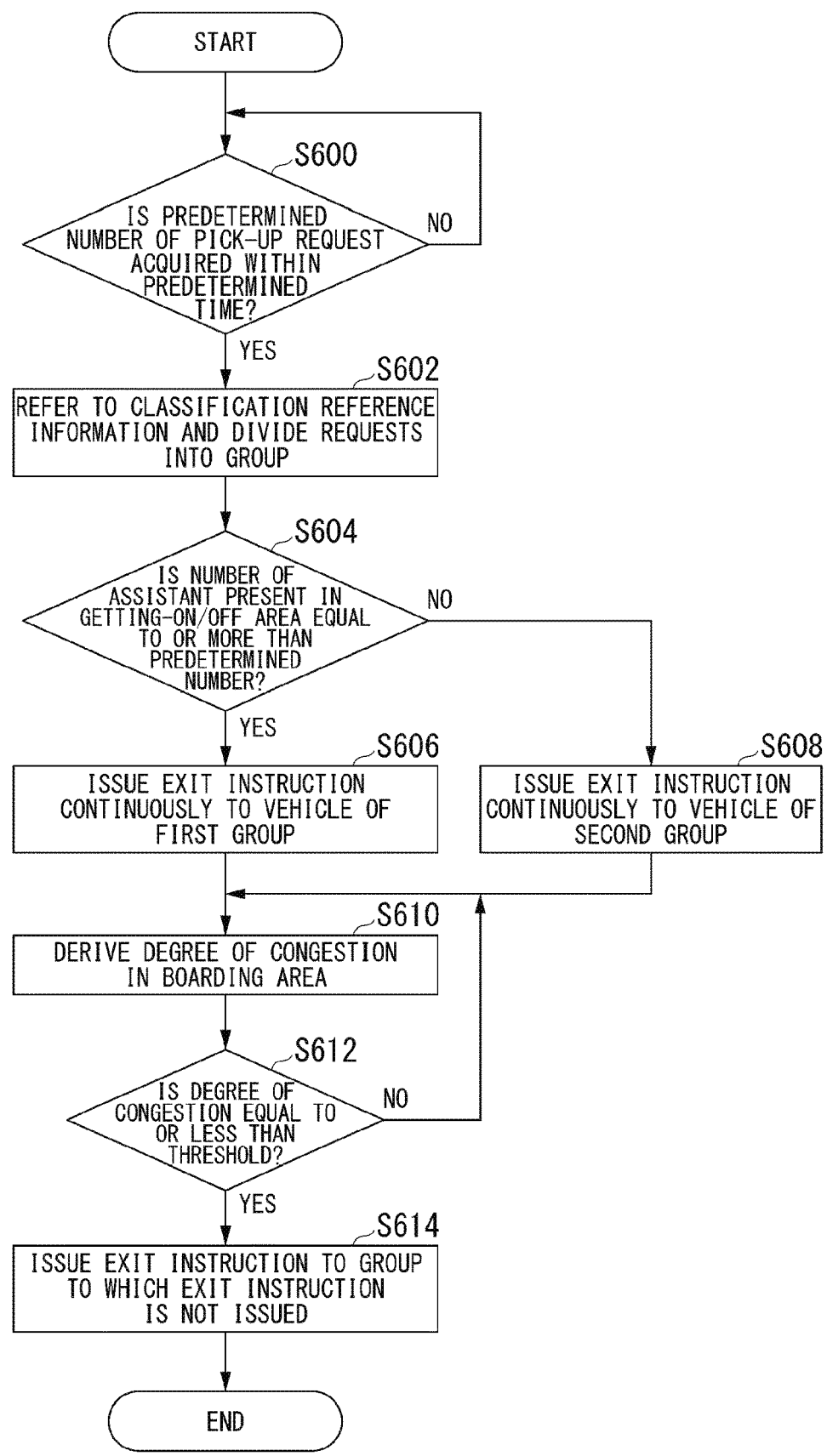
FIG. 22 is a flowchart which shows an example of a flow of processing executed by a parking lot management device according to a third embodiment.

FIG. 22 is a flowchart which shows an example of a flow of processing executed by the parking lot management device 400 according to the third embodiment. Processing of steps S600, S602, S610, and S612 of FIG. 22 is the same as the processing of steps S200, S202, S206, and S208 of FIG. 8, and thus description thereof will be omitted.

After the processing of step S602, the information processor 424 refers to the schedule information and determines whether the number of assistants present in the getting-on/off area 320 is equal to or more than a predetermined number (step S604). When the number of assistants is equal to or more than a predetermined number, the information processor 424 continuously issues exit instructions to the first vehicles of the first group (step S606). When the number of assistant is not equal to or more than a predetermined number, the information processor 424 continuously issues exit instructions to the second vehicles of the second group (step S608).

After the processing of step S608, processing of steps S610 and S612 will be executed. In step S612, when it is determined that the degree of congestion is not equal to or less than the threshold (when it is determined that the degree exceeds the threshold), the procedure returns to processing of step S610. In step S612, when it is determined that the degree of congestion is equal to or less than the threshold, the information processor 424 continuously issues exit instructions to the vehicles of a group to which exit instructions are not issued (step S614). As a result, processing of one routine of this flowchart ends.

According to the third embodiment described above, the parking lot management device 400 changes the order of exit instructions which cause the automated exit processing according to requests to be performed on the basis of the position information of the assistant, thereby performing an exit management in accordance with an operation system of the facility.

Fourth Embodiment

Hereinafter, a fourth embodiment will be described. In the fourth embodiment, the parking lot management device 400 classifies pick-up requests into first requests of first users who are estimated to be slow in boarding a vehicle in the getting-on/off area 320 and second requests of second users who are estimated to board a vehicle faster than the first users, and causes a vehicle associated with a terminal device which is a transmission source of one or more of the first requests to perform automated exit processing such that automated exit processing according to the first request is continuously executed, on the basis of a result of the classification. In the following description, a difference from the first embodiment will be mainly described.

Figure 23:
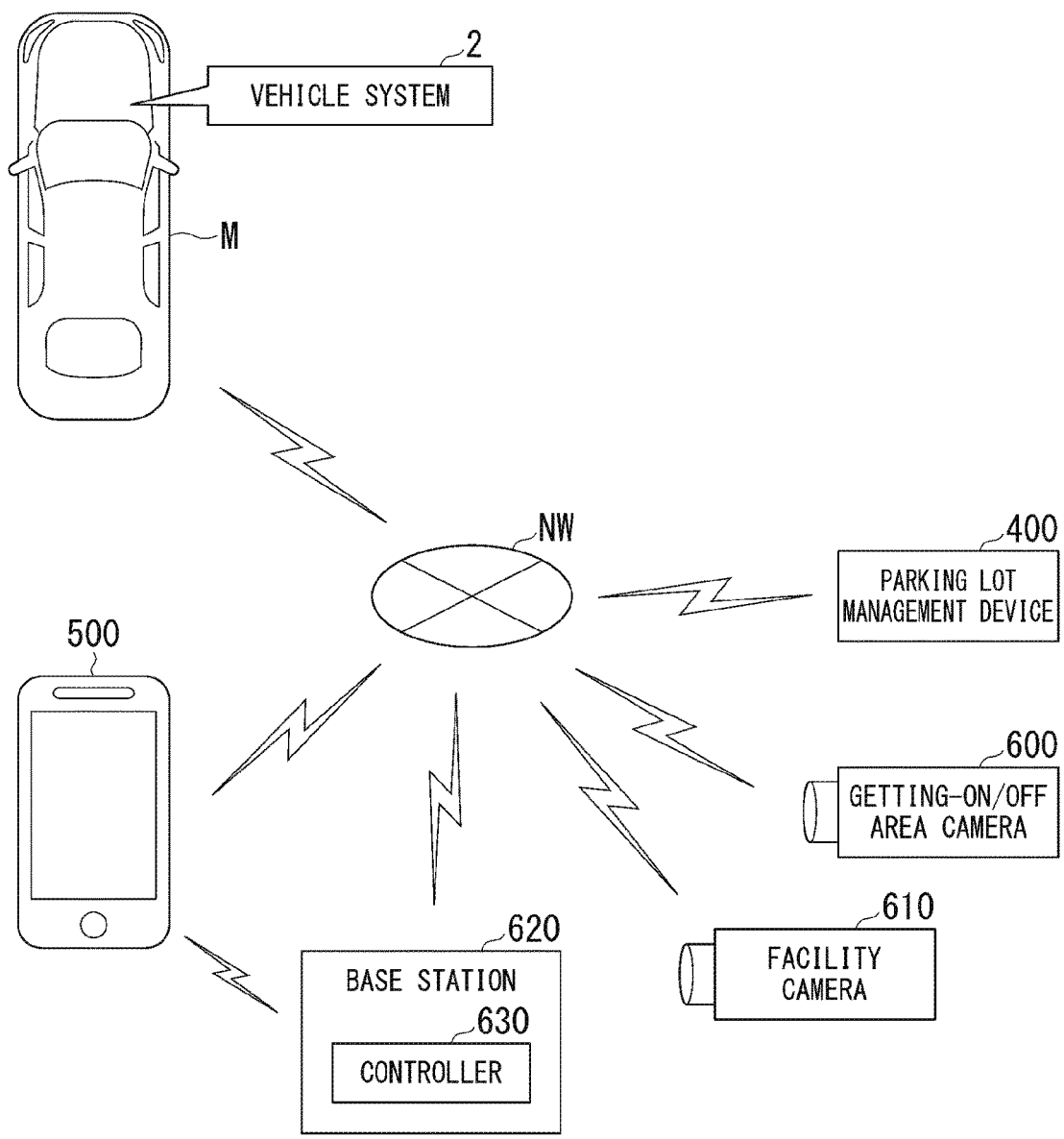
FIG. 23 is a diagram which shows an example of a configuration of a parking lot management system according to a fourth embodiment.

FIG. 23 is a diagram which shows an example of a configuration of a parking lot management system 1A according to the fourth embodiment. A user who is estimated to be slow in boarding a vehicle is a user having a predetermined degree or more of luggage, a user accompanying a child, a user of a vehicle with a child seat installed therein, or the like.

Information for identifying the user estimated to be slow in boarding a vehicle may be associated with the terminal device ID or the vehicle ID and stored in the storage 430 of the parking lot management device 400 in advance, or may be transmitted from another device. It may also be derived using the following method.

A terminal device 500 in a modification includes a position information acquirer that acquires first position information of the terminal device 500 at a predetermined interval using a global positioning system (GPS) or the like. The terminal device 500 transmits the first position information acquired by the position information acquirer to the parking lot management device 400 at a predetermined interval.

A parking lot management system 1 in the modification further includes a plurality of facility cameras 610 and a plurality of base stations (access points) 620 in addition to the functional configuration of the parking lot management system 1 of each embodiment described above. The facility cameras 610 are installed in each area in the facility. The facility cameras 610 capture images of an imaging area at a predetermined interval and transmit the captured images to the parking lot management device 400 using communication interfaces thereof. The storage 430 of the parking lot management device 400 stores information such as identification information of each of the facility cameras 610, position information indicating a position in which each of the facility cameras 610 is installed, an imaging area, and information indicating a corresponding relationship between a position in a captured image and a position in a real space. As a result, the monitor 422 of the parking lot management device 400 can refer to the information stored in the storage 430 described above, recognize which position (area) is taken in an image, or identify a position in the image with respect to the position in a real space on the basis of the image captured by the facility cameras 610 and the identification information of the facility cameras 610 transmitted in association with the image.

The base station 620 wirelessly communicates with the terminal device 500, and transmits information (for example, pick-up requests or other information) transmitted by the terminal device 500 to the parking lot management device 400 via a network NW. The controller 630 of the base station 620 estimates second position information of the terminal device 500 on the basis of, for example, a result of the communication with the terminal device 500. The parking lot management device 400 may acquire a result of communication between the terminal device 500 and the base station 620, and estimate the second position information of the terminal device 500 on the basis of the acquired information. For example, the controller 630 of the base station 620 estimates the second position information of the terminal device 500 with respect to the controller 630 on the basis of an intensity of radio waves transmitted by the terminal device 500 and a direction of the transmitted radio waves and transmits information in which a result of the estimation and the terminal device ID of the terminal device 500 are associated with each other to the parking lot management device 400. For example, the controller 630 refers to a predefined function, a predetermined map, and the like and estimates the second position information on the basis of the intensity of radio waves and the direction of the transmitted radio waves.

The storage 430 of the parking lot management device 400 stores position information of each base station 620. The information processor 424 refers to the position information of each base station 620 and acquires 500 the second position information of the terminal device 500 on the basis of the second position information of the base station 620 which has transmitted the second position information. Then, the information processor 424 identifies the position information of the terminal device 500 on the basis of the first position information and the second position information. For example, the information processor 424 corrects the first position information or the second position information using a correction value derived on the basis of an error of the first position information or the second position information, which is experimentally obtained in advance, and thereby the position information of the terminal device 500 may be identified.

For example, the information processor 424, on the basis of a timing at which the terminal device 500 has transmitted a pick-up request and a position of the terminal device 500 at this timing, acquires an image in which the position of the terminal device 500 is captured at the timing at which a pick-up request is transmitted and identifies the position of a user (the terminal device 500) that has transmitted the pick-up request in the acquired image.

The monitor 422 analyzes the image acquired by the information processor 424 and determines an amount of luggage held by the user identified by the information processor 424 in the image, whether the user is accompanied by a child, and the like. The classifier 423 classifies the user who has transmitted a pick-up request as the first user or the second user on the basis of a result of the determination by the monitor 422.

[Flowchart]

Figure 24:
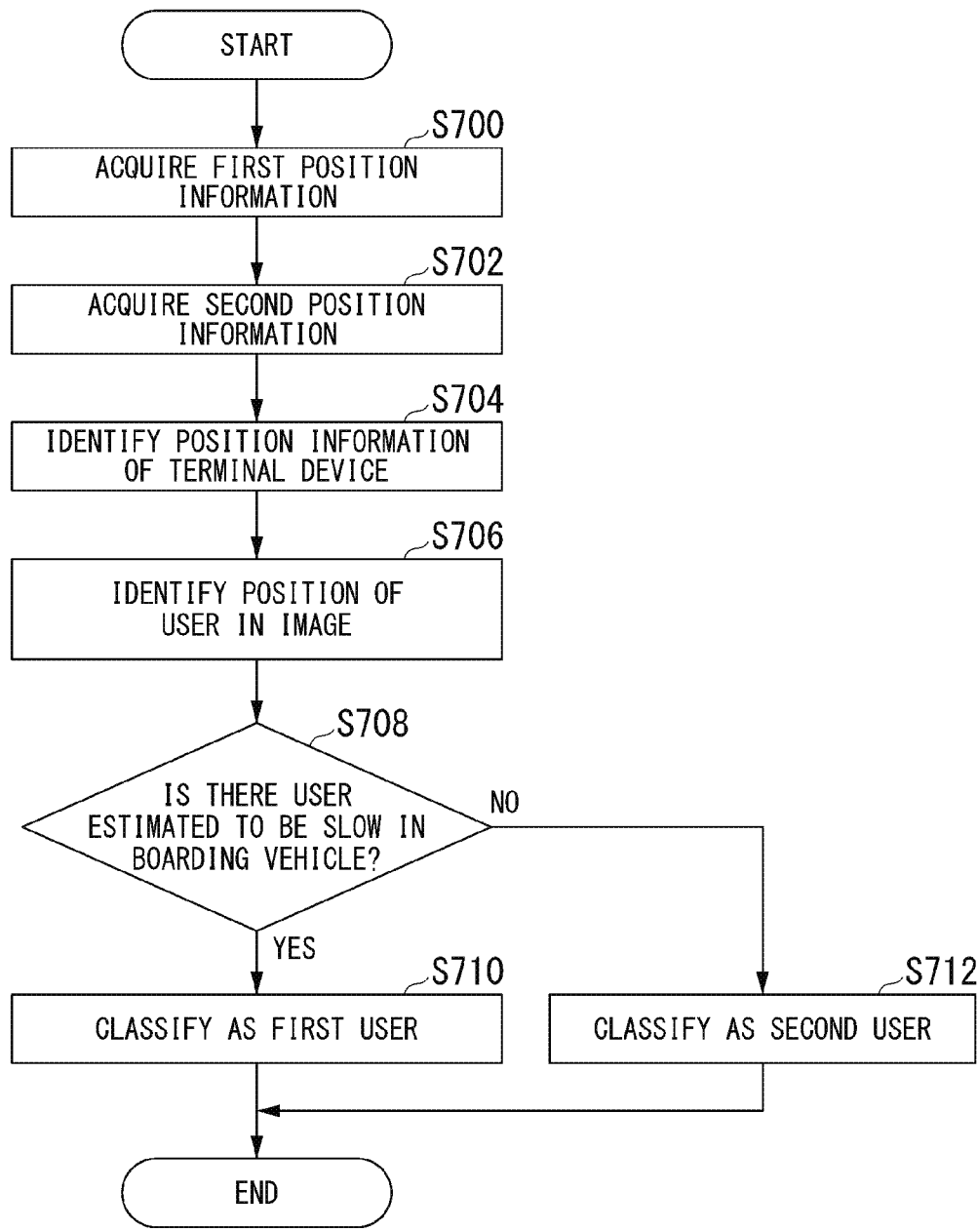
FIG. 24 is a flowchart which shows the example of the flow of the processing executed by the parking lot management device.

FIG. 24 is a flowchart which shows an example of a flow of processing executed by the parking lot management device 400. First, the information processor 424 acquires the first position information from the terminal device 500 (step S700). Next, the information processor 424 acquires the second information from the base station 620 (step S702). Next, the information processor 424 identifies the position information of the terminal device 500 at the timing at which the terminal device 500 has transmitted a pick-up request on the basis of the first position information and the second position information (step S704).

Next, the information processor 424, on the basis of the position of the terminal device 500, acquires an image in which a position thereof is captured at the timing at which a pick-up request is transmitted, and identifies a position of the user who has transmitted the pick-up request in the acquired image (step S706).

Next, the monitor 422 determines whether the user in the image is a user who is estimated to be slow in boarding a vehicle on the basis of the position identified in step S708 (step S708). When it is determined that the user is a user who is estimated to be slow in boarding a vehicle, the classifier 423 classifies the user as the first user (step S710). When it is determined that the user is not a user who is estimated to be slow in boarding a vehicle, the classifier 423 classifies the user as the second user (step S712). As a result, processing of one routine of this flowchart ends.

According to the fourth embodiment described above, the parking lot management device 400 treats the user who is estimated to be slow in boarding a vehicle as the first user, thereby achieving the same effects as effects achieved in the first embodiment to the third embodiment.

Fifth Embodiment

Hereinafter a fifth embodiment will be described. In the fifth embodiment, the parking lot management device 400 treats a user (a user of a vehicle from which an occupant has taken a predetermined time or more to get off) who has taken (took) a predetermined time or more to get off the vehicle M in the getting-on/off area 320 as the first user. Time required for getting off from the host vehicle M in the getting-on/off area 320 is, for example, time required for all the occupants of the vehicle to get off the vehicle, or time required from the vehicle stopping at the getting-on/off area 320 to departing from the getting-on/off area 320. In the following description, a difference from the first embodiment to the fourth embodiment will be mainly described. A user who takes (took) a predetermined time or more to get off the host vehicle M in the getting-on/off area 320 is an example of the "first users who are estimated to take a long time to board the vehicle." A user who takes (took) time less than the predetermined time to get off the host vehicle M in the getting-on/off area 320 is an example of the "second users who are estimated to take a shorter time to board the vehicle than the first users."

For example, the monitor 422 estimates the getting-off time of a user from a time-series image in which the getting-on/off area 320 is captured. For example, the monitor 422 estimates the user in the image, a state in which the user is boarding a vehicle, a state in which the user is getting off the vehicle, the vehicle, and the like using a method such as pattern matching, and estimates the getting-off time of the user on the basis of a result of the estimation. Then, the monitor 422 tracks the user who has gotten off the vehicle on the basis of an image captured by the getting-on/off area camera 600 and images captured by one or more facility cameras 610. That is, the tracking user is stored in the storage 430 in association with time required for the user to get off the vehicle.

When the terminal device 500 of the tracking user has transmitted a parking request to the parking lot management device 400, the information processor 424 estimates position information of the user at a timing at which the parking request is transmitted on the basis of transmitted radio waves, and identifies the tracking user in the image on the basis of the estimated position information. That is, since the parking lot management device 400 ascertains in which position in the image the tracking user is present, it identifies which of the tracking users has transmitted the parking request in the real space and associates the user who has transmitted the parking request with a user in the tracked image.

Then, the information processor 424 acquires the getting-off time of the user who has transmitted the parking request. The information processor 424, when the getting-off time of the user is the predetermined time or more, associates information indicating that the user is the first user with the terminal device ID included in the parking request. When a pick-up request is transmitted and it is determined that the information indicating that the user is the first user is associated with the terminal device ID described above, the information processor 424 treats a user who has transmitted the pick-up request as the first user.

[Flowchart]

Figure 25:
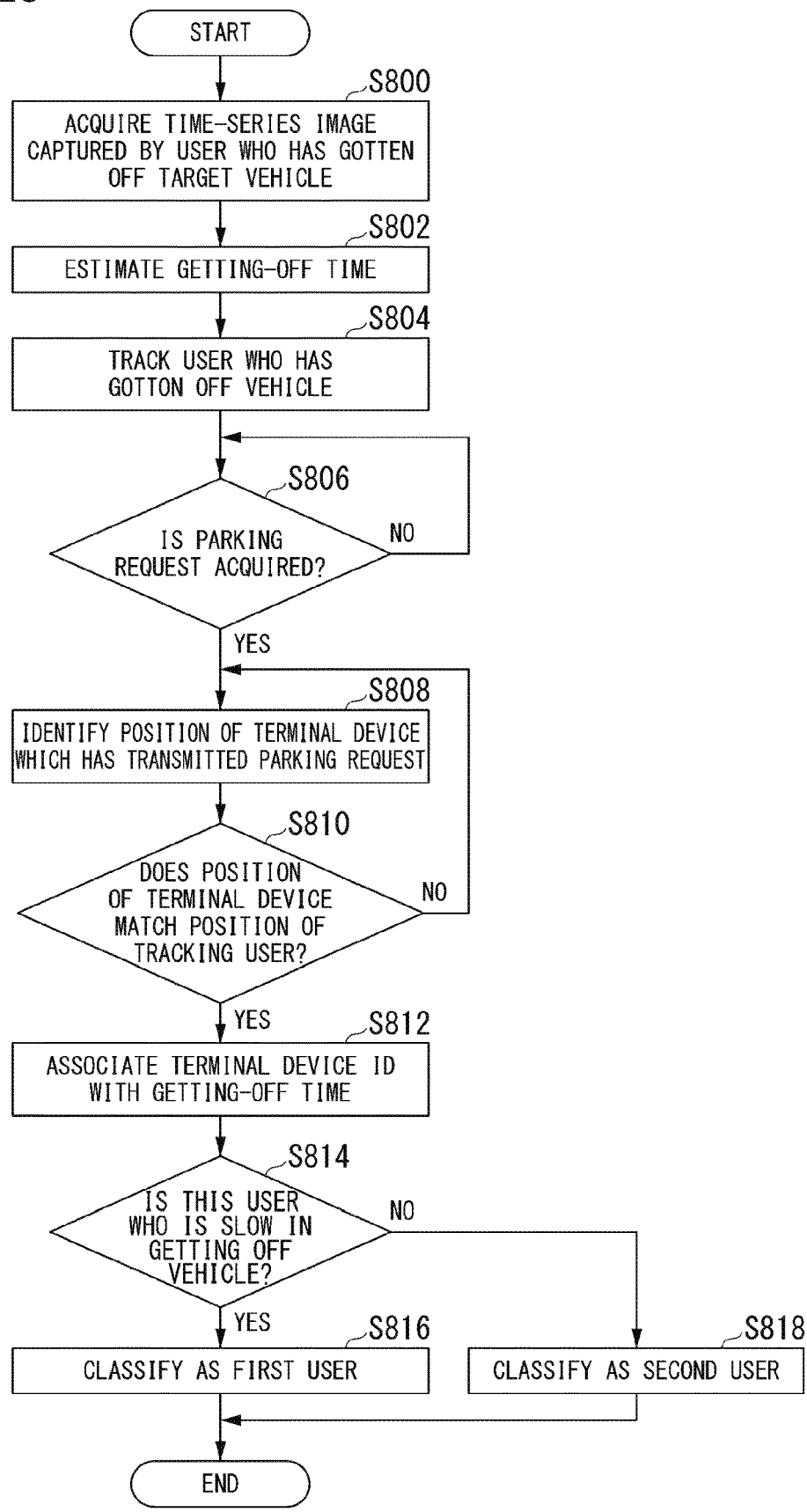
FIG. 25 is a flowchart which shows an example of a flow of processing executed by the parking lot management device.

FIG. 25 is a flowchart which shows an example of a flow of processing executed by the parking lot management device 400. First, the monitor 422 acquires a time-series image in which a user who has gotten off a target vehicle is captured (step S800). Next, the monitor 422 estimates a time at which the user has gotten off the vehicle on the basis of the image acquired in step S800 (step S802). Next, the monitor 422 tracks the user who has gotten off the vehicle (step S804). For example, the monitor 422 tracks the user who has gotten off the vehicle on the basis of an image captured by the getting-on/off area camera 600 or the facility camera 610.

Next, the information processor 424 determines whether a parking request has been acquired from the terminal device 500 (step S806). Next, the information processor 424 identifies a position of the terminal device 500 which has transmitted the parking request (step S808). For example, the information processor 424 acquires the first position information or the second position information of the fourth embodiment described above, thereby identifying the position of the terminal device 500.

Next, the information processor 424 determines whether the position of the terminal device 500 identified in step S808 matches a position of the tracking user (step S810). For example, the monitor 422 identifies which position is captured in a tracked image, identifies at which position the tracking user is present in the identified image, and converts the position that is a result of the identification into a position in a real space, thereby identifying the position of the tracking user. In step S810, when it is determined that the positions do not match, the procedure returns to the processing of step S808.

In step S810, when it is determined that the positions match, the information processor 424 causes the storage 430 to store a terminal device ID of the terminal device 500 which has transmitted a parking request and a getting-off time of the user whose position is determined to match the position of the terminal device 500 in step S810 in association with each other (step S812).

Next, the classifier 423 determines whether the user is a user who is slow in getting off a vehicle on the basis of the getting-off time stored in the storage 430 in step S812 (step S814). When the user is a user who is slow in getting off a vehicle, the classifier 423 classifies the user as a first user (step S816). When the user is a user who is not slow in getting off a vehicle, the classifier 423 classifies the user as a second user (step S818). As a result, processing of one routine of this flowchart ends.

According to the fifth embodiment described above, the parking lot management device 400 treats the user who is estimated to be slow in getting off a vehicle as the first user, thereby achieving the same effects as those obtained in the first embodiment to the fourth embodiment.

Each embodiment described above may be implemented in an appropriate combination. Part of the processing of the flowchart described above may be omitted, and the processing of the flowchart may be executed in parallel. Part of the processing in each embodiment may also be performed using another device.

[Hardware Configuration]

Figure 26:
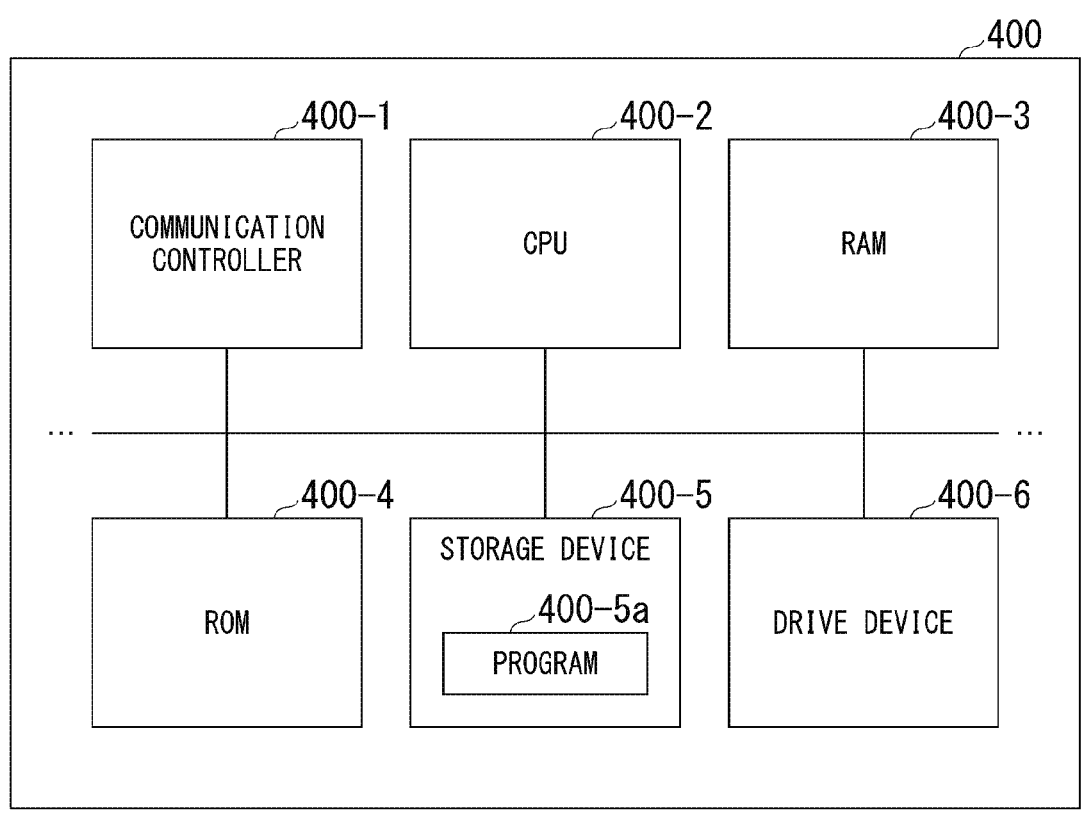
FIG. 26 is a diagram which shows an example of a hardware configuration of the parking lot management device according to the embodiment.

FIG. 26 is a diagram which shows an example of a hardware configuration of the parking lot management device 400 of the embodiments. As shown in FIG. 26, the parking lot management device 400 is configured to include a communication controller 400-1, a CPU 400-2, a random access memory (RAM) 400-3 used as a working memory, a read only memory (ROM) 400-4 that stores a booting program and the like, a storage device 400-5 such as a flash memory or a hard disk drive (HDD), a drive device 400-6, and the like being connected to one another by an internal bus or a dedicated communication line. The communication controller 400-1 communicates with components other than the parking lot management device 400. The storage device 400-5 stores a program 400-5a executed by the CPU 400-2. This program is expanded in the RAM 400-3 by a direct memory access (DMA) controller (not shown) or the like and executed by the CPU 400-2. As a result, some or all of the acquirer 421, the monitor 422, the classifier 423, the information processor 424, and the provider 425 are realized.

The embodiments described above can be expressed as follows.

A management device is configured to include a storage device that stores a program, and a hardware processor, wherein the hardware processor executes a program stored in the storage device, thereby acquiring a plurality of requests for automated exit processing of causing a vehicle to exit from a parking lot and causing an occupant of the vehicle to board the vehicle in a boarding area, classifying the acquired requests into first requests of first users who are permitted to use a specific parking space and second requests of second users who are permitted to use the specific parking space, and causing a vehicle associated with a terminal device which is a transmission source of the acquired one or more of the first requests to perform automated exit processing such that automated exit processing according to the one or more of the first requests is continuously executed, or causing a vehicle associated with a terminal device which is a transmission source of one or more of the second requests acquired to perform automated exit processing such that automated exit processing according to the one or more of the second requests is continuously executed, on the basis of a result of the classification.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A management device comprising:
an acquirer configured to acquire requests for automated exit processing of causing a vehicle to exit from a parking lot and causing an occupant of the vehicle to board the vehicle in a boarding area;
a classifier configured to classify the requests acquired by the acquirer into first requests of first users who are permitted to use a specific parking space and second requests of second users who are not permitted to use the specific parking space; and
an instructor configured to cause vehicles associated with terminal devices which are transmission sources of one or more of the first requests acquired by the acquirer to perform automated exit processing such that automated exit processing according to the one or more of the first requests is continuously executed, or to cause vehicles associated with terminal devices which are transmission sources of one or more of the second requests acquired by the acquirer to perform automated exit processing such that automated exit processing according to the one or more of the second requests is continuously executed, on the basis of a result of the classification by the classifier.

2. The management device according to claim 1,
wherein the instructor prioritizes the first requests classified by the classifier over the second requests classified by the classifier, or prioritizes the second requests classified by the classifier over the first requests classified by the classifier.

3. The management device according to claim 2,
wherein, when the acquirer has acquired a predetermined number or more of the first requests within a predetermined time, the instructor causes vehicles associated with terminal devices which are transmission sources of one or more of the first requests to continuously perform the automated exit processing.

4. The management device according to claim 2,
wherein, when the acquirer has acquired a predetermined number or more of the second requests within a predetermined time, the instructor causes vehicles associated with terminal devices which are transmission sources of one or more of the second requests to continuously perform the automated exit processing.

5. The management device according to claim 3,
wherein, when a degree of congestion in the boarding area is equal to or less than a threshold, the instructor stops continuously performing the automated exit processing.

6. The management device according to claim 2,
wherein the acquirer acquires the first requests and desire level information indicating desire levels for the first requests from first terminal devices held by the first users, and
the instructor adjusts priority levels of the first requests on the basis of the desire levels.

7. The management device according to claim 1,
wherein the second requests are requests transmitted by second terminal devices held by the second users, and
the device further comprises an information provider configured to notify the second terminal devices of information indicating the first requests are prioritized over the second requests or information indicating that starts of automated exit processing for the second requests are delayed by prioritizing the first requests over the second requests.

8. The management device according to claim 7,
wherein the information provider provides information for inquiring of the second terminal devices whether to cancel the second requests after the notification.

9. The management device according to claim 8,
wherein the acquirer acquires cancellation information of the second requests transmitted by the second terminal devices after the inquiry, and
the instructor cancels the second requests on the basis of the cancellation information of the second requests, and furthermore preferentially performs automated exit processing associated with the second requests of second users of the second terminal devices which have transmitted the cancellation information in next and subsequent automated exit processing.

10. The management device according to claim 9,
wherein the acquirer acquires designation information in which a timing for increasing priority levels of the second requests transmitted by the second terminal devices which have transmitted the cancellation information is designated, and
the instructor increases the priority levels of the second requests transmitted by the second terminal devices on the basis of the designation information.

11. The management device according to claim 2,
wherein the acquirer acquires disposition information of an assistant who assists an action of an occupant of the vehicle in the boarding area, and
the instructor changes an order of exit instructions to cause vehicles subjected to automated exit processing in accordance with the requests to perform automated exit processing on the basis of position information of the assistant.

12. A management device comprising:
an acquirer configured to acquire requests for automated exit processing of causing a vehicle to exit from a parking lot and causing an occupant of the vehicle to board the vehicle in a boarding area;
a classifier configured to classify requests acquired by the acquirer into first requests of first users who are estimated to take a long time to board the vehicle in the boarding area and second requests of second users who are estimated to take a shorter time to board the vehicle than the first users; and
an instructor configured to cause vehicles associated with terminal devices which are transmission sources of one or more of the first requests acquired by the acquirer to perform automated exit processing such that automated exit processing according to the one or more of the first requests is continuously executed, or to cause vehicles associated with terminal devices which are transmission sources of one or more of the second requests acquired by the acquirer to perform automated exit processing such that automated exit processing according to the one or more of the second requests is continuously executed, on the basis of a result of the classification by the classifier.

13. The management device according to claim 12,
wherein a user who is estimated to be slow in boarding the vehicle includes a user carrying a certain degree or more of luggage, a user accompanying a child, a user of a vehicle with a child seat installed therein, or a user who took a predetermined time or more to get off a vehicle.

14. A management method comprising:
by a computer,
acquiring requests for automated exit processing of causing a vehicle to exit from a parking lot and causing an occupant of the vehicle to board the vehicle in a boarding area;
classifying the acquired requests into first requests of first users who are permitted to use a specific parking space and second requests of second users who are permitted to use the specific parking space; and
causing vehicles associated with terminal devices which are transmission sources of the acquired one or more of the first requests to perform automated exit processing such that automated exit processing according to the one or more of the first requests is continuously executed, or causing vehicles associated with terminal devices which are transmission sources of the acquired one or more of the second requests to perform automated exit processing such that automated exit processing according to the one or more of the second requests is continuously executed, on the basis of a result of the classification.

15. A non-transitory computer-readable storage medium that stores a computer program to be executed by a computer to perform at least:

acquiring requests for automated exit processing of causing a vehicle to exit from a parking lot and causing an occupant of the vehicle to board the vehicle in a boarding area;

classifying the acquired requests into first requests of first users who are permitted to use a specific parking space and second requests of second users who are permitted to use the specific parking space, and causing vehicles associated with terminal devices which are transmission sources of the acquired one or more of the first requests to perform automated exit processing such that automated exit processing according to the one or more of the first requests is continuously executed, or causing vehicles associated with terminal devices which are transmission sources of the acquired one or more of the second requests to perform automated exit processing such that automated exit processing according to the one or more of the second requests is continuously executed, on the basis of a result of the classification.

* * * * *